United States Patent
Sekine

(10) Patent No.: US 10,564,394 B2
(45) Date of Patent: Feb. 18, 2020

(54) IMAGING LENS

(71) Applicant: KANTATSU CO., LTD., Yaita-shi, Tochigi (JP)

(72) Inventor: Yukio Sekine, Sukagawa (JP)

(73) Assignee: KANTATSU CO., LTD., Yaita (JP)

( * ) Notice: Subject to any disclaimer, the term of this patent is extended or adjusted under 35 U.S.C. 154(b) by 0 days.

(21) Appl. No.: 15/801,507

(22) Filed: Nov. 2, 2017

(65) Prior Publication Data

US 2018/0348480 A1 Dec. 6, 2018

(30) Foreign Application Priority Data

Nov. 2, 2016 (JP) .................................. 2016-215076

(51) Int. Cl.
| | |
|---|---|
| *G02B 9/62* | (2006.01) |
| *G02B 27/00* | (2006.01) |
| *H04N 5/335* | (2011.01) |
| *G02B 13/06* | (2006.01) |
| *G02B 13/00* | (2006.01) |
| *G02B 13/04* | (2006.01) |

(52) U.S. Cl.
CPC ........... *G02B 9/62* (2013.01); *G02B 13/0045* (2013.01); *G02B 13/04* (2013.01); *G02B 13/06* (2013.01); *G02B 27/0037* (2013.01); *H04N 5/335* (2013.01)

(58) Field of Classification Search
CPC ...... G02B 9/62; G02B 13/0045; G02B 13/04; G02B 13/06; G02B 27/0037; H04N 5/335
USPC ................................................ 359/713, 752
See application file for complete search history.

(56) References Cited

U.S. PATENT DOCUMENTS

| | | | |
|---|---|---|---|
| 9,158,094 B1 | 10/2015 | Chen et al. | |
| 2014/0029115 A1 | 1/2014 | Liao et al. | |
| 2015/0207998 A1* | 7/2015 | Lin ................... | H04N 5/23296 348/148 |
| 2015/0212296 A1 | 7/2015 | Huang et al. | |
| 2016/0252709 A1 | 9/2016 | Lin et al. | |
| 2016/0291292 A1 | 10/2016 | Lin et al. | |
| 2017/0082834 A1* | 3/2017 | Tang .................. | G02B 13/0045 |

(Continued)

FOREIGN PATENT DOCUMENTS

| | | |
|---|---|---|
| CN | 105892020 A | 8/2016 |
| JP | 2016-031531 A | 3/2016 |
| TW | 201245757 A | 11/2012 |

(Continued)

*Primary Examiner* — George G King
(74) *Attorney, Agent, or Firm* — Oliff PLC

(57) ABSTRACT

There is provided an imaging lens with high resolution which effectively achieves low-profileness while maintaining the wide field of view, and favorably corrects aberrations.

The imaging lens comprising a first lens having negative refractive power, a second lens having positive refractive power, a third lens, a fourth lens having positive refractive power, a fifth lens having negative refractive power as a double-sided aspheric lens, and a sixth lens as a double-sided aspheric lens, wherein the first lens has a concave surface facing the image side, and the aspheric surface on the image side of the sixth lens is formed as a concave surface near the optical axis and has at least one pole point at an off-axial point, and a below conditional expression (1) is satisfied:

$$\omega \geq 45° \quad (1)$$

where
$\omega$: a half field of view.

14 Claims, 14 Drawing Sheets

(56) References Cited

U.S. PATENT DOCUMENTS

2018/0106987 A1* 4/2018 Lin .................. G02B 9/62
2018/0210177 A1* 7/2018 Liu ................ G02B 13/0045

FOREIGN PATENT DOCUMENTS

TW       I533021 B    5/2016
TW    201631356 A    9/2016

* cited by examiner

IMAGING LENS

The present application is based on and claims priority of Japanese patent applications No. 2016-215076 filed on Nov. 2, 2016, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in a compact imaging device, and more particularly to an imaging lens which is built in an imaging device mounted in an increasingly compact and low-profile smartphone and mobile phone, a PDA (Personal Digital Assistant), a game console, PC, and an information terminal such as a robot, moreover, a home appliance and an automobile with the camera function.

Description of the Related Art

In recent years, it becomes common that camera function is mounted in many information terminals. Furthermore, products have been made one after another, such as home appliances with a camera, which consumer's convenience is excellent. Demand of products such as the home appliances and the information terminals with the camera function is more increased, and development of products will be rapidly made accordingly.

In a conventional art, as an imaging lens mounted in such information terminals, for example, following Patent Document 1 discloses an imaging lens comprising 6 lenses.

Patent Document 1 (JP-A-2016-031531) discloses an imaging lens comprising, in order from an object side to an image side along with an optical axis, a first lens element, a second lens element, a third lens element, a fourth lens element, a fifth lens element and a sixth lens element, each having an object-side surface facing an object side and an image-side surface facing an image side, and refractive power.

In the imaging lens disclosed in the above Patent Document 1, field of view is wide about 140 to 160 degrees, however, a ratio of total track length to diagonal length is about 1.3 to 1.5 and low-profileness is not sufficiently satisfied. Additionally, when the low-profileness is made using lens composition disclosed in the above Patent Document 1, there is a problem that aberration correction in peripheral area is very difficult, and excellent optical performance is not be obtained.

SUMMARY OF THE INVENTION

The present invention has been made in view of the above problems, and an object of the present invention is to provide an imaging lens with high resolution which effectively achieves low-profileness while maintaining a wide field of view, and favorably corrects aberrations.

Here, "wide field of view" implies that a half field of view in a range capable of photographing is 45 degrees or more (namely the field of view is 90 degrees or more). "Low-profile" implies that total track length is less than 5.5 mm, and a ratio of total track length to diagonal length is less than 1.1. Regarding the ratio of total track length to diagonal length, the diagonal length of the effective imaging plane of the image sensor is equal to the diameter of an effective image circle whose radius is the vertical height from an optical axis to the point where a light ray incident on the imaging lens at a maximum field of view enters the image plane, that is, the maximum image height.

Regarding terms used in the present invention, unless otherwise noted, a convex surface or a concave surface of lens surfaces implies that the paraxial portion (portion near the optical axis) of the surface is convex or concave. The pole point implies that a point on an aspheric surface at which a tangential plane intersects the optical axis perpendicularly. The total track length is, for example, defined as a distance along the optical axis from an object-side surface of an optical element nearest to the object side to the imaging plane, when thickness of the optical element such as an IR cut filter or a cover glass located between the last lens and the imaging plane of the image sensor is regarded as an air. Furthermore, the effective diameter implies the diameter of the circle whose radius is the vertical height from the optical axis to the intersection point of the lens surface and the light ray among pencil of light rays arriving at the maximum image height, which passes the farthest area from the optical axis.

In order to achieve the above object, an imaging lens according to the present invention comprises, in order from an object side to an image side, a first lens having negative refractive power, a second lens having positive refractive power, a third lens, a fourth lens having positive refractive power, a fifth lens having negative refractive power as a double-sided aspheric lens, and a sixth lens as a double-sided aspheric lens. The first lens has a concave surface facing the image side, and the aspheric surface on the image side of the sixth lens is formed as a concave surface near the optical axis and has at least one pole point at an off-axial point, and a below conditional expression (1) is satisfied:

$$\omega \geq 45° \quad (1)$$

where $\omega$: a half field of view.

According to the above structure, the first lens has negative refractive power and the concave surface facing the image side, and light ray incident to the first lens over wide field of view enters the second lens in nearly parallel along the optical axis.

The second lens has positive refractive power and contributes to low-profileness.

The fourth lens keeps proper balance of the positive refractive powers of the second lens and the fourth lens, achieves low-profileness, and corrects astigmatism and field curvature.

The fifth lens has negative refractive power and corrects chromatic aberration. The fifth lens is a double-sided aspheric lens, and controls light ray incident angle to the image sensor and favorably corrects distortion.

The sixth lens has the concave surface facing the image side near the optical axis and ensures a back focus. The sixth lens is a double-sided aspheric lens, and an aspheric surface on the image side has the pole point and changes to the convex surface at an area apart from the optical axis. Thus having such aspheric surfaces, together with the fifth lens, the sixth lens also controls the light ray incident angle to the image sensor and favorably corrects distortion.

According to the imaging lens having the above structure, it is preferable that a below conditional expression (a) is satisfied to obtain the imaging lens which is made sufficiently low-profile:

$$TTL/2ih \leq 1.1 \quad (a)$$

where
TTL: the total track length,
ih: a maximum image height.

According to the imaging lens having the above structure, it is preferable that the first lens satisfies a below conditional expression (2):

$$0.1 < SAG\ L1R/r2 < 0.6 \quad (2)$$

where
SAG L1R: an amount of sag at the peripheral area of the effective diameter of the image-side surface of the first lens,
r2: a curvature radius of the image-side surface of the first lens.

Conditional expression (2) defines a condition for improving facilitation of the wide field of view and manufacturing. When the conditional expression (2) is satisfied, while maintaining a proper angle of the right lay emitted from the first lens, the right lay enters the second lens. Accordingly, the wide field of view can be easily achieved. Furthermore, uneven thickness of the first lens is suppressed and manufacturing is facilitated.

According to the imaging lens having the above structure, it is preferable that the first lens satisfies a below conditional expression (3):

$$0.5 < r2/f < 1.5 \quad (3)$$

where
r2: the curvature radius of the image-side surface of the first lens,
f: a focal length of the overall optical system.

The conditional expression (3) defines a condition for improving the facilitation of the wide field of view, and for favorably correcting the aberrations. When the conditional expression (3) is satisfied, the curvature radius of the image-side surface of the first lens becomes appropriate, and while maintaining a proper angle of the right lay emitted from the first lens, the right lay enters the second lens. Accordingly, the wide field of view can be easily achieved.

According to the imaging lens having the above structure, it is preferable that the second lens has the convex surface facing the object side near the optical axis. Thus configured, the total track length is shortened.

According to the imaging lens having the above structure, it is preferable that the third lens has the negative refractive power and the concave surface facing the image side near the optical axis. Thus configured, chromatic aberration occurred at the first lens and the second lens is favorably corrected.

According to the imaging lens having the above structure, it is preferable that the fourth lens has the convex surface facing the image side near the optical axis. Thus configured, an off-axis light ray is guided to the fifth lens at a small refractive angle and the astigmatism and the field curvature is favorably corrected.

According to the imaging lens having the above structure, it is preferable that the sixth lens is a meniscus lens having the negative refractive power and the convex surface facing the object side near the optical axis. Thus configured, together with the aspheric surface of the object-side surface, the light ray incident angle to the image sensor is controlled. Furthermore, the sixth lens is the meniscus lens, therefore, uneven thickness of the sixth lens is suppressed and the manufacturing is facilitated.

According to the imaging lens having the above structure, it is preferable that a below conditional expression (4) is satisfied:

$$f2-f4>0 \quad (4)$$

where
f2: a focal length of the second lens,
f4: a focal length of the fourth lens.

The conditional expression (4) defines a condition for effectively achieving proper corrections of astigmatism and field curvature based on relationship of focal length of the second lens and focal length of the fourth lens. When the conditional expression (4) is satisfied, the astigmatism and the field curvature are favorably corrected.

According to the imaging lens having the above structure, it is preferable that below conditional expressions (5), (6), (7), (8), (9) and (10) are satisfied:

$$-2.5 < f1/f < -1.0 \quad (5)$$

$$0.5 < f2/f < 1.5 \quad (6)$$

$$-6.0 < f3/f < -1.5 \quad (7)$$

$$0.5 < f4/f < 1.5 \quad (8)$$

$$-6.0 < f5/f < -1.5 \quad (9)$$

$$-2.5 < f6/f < -1.0 \quad (10)$$

where
f1: a focal length of the first lens,
f2: a focal length of the second lens,
f3: a focal length of the third lens,
f4: a focal length of the fourth lens,
f5: a focal length of the fifth lens,
f6: a focal length of the sixth lens,
f: a focal length of the overall optical system.

The conditional expression (5) defines a condition for effectively achieving the facilitation of the wide field of view, and proper corrections of the field curvature and the distortion, based on a ratio of the focal length of the first lens and the focal length of the overall optical system. When the conditional expression (5) is satisfied, the negative refractive power of the first lens is suppressed from being small, and while maintaining a proper angle of the right lay emitted from the first lens, the right lay enters the second lens. Accordingly, the wide field of view can be easily achieved. Furthermore, the refractive power of the first lens against the focal length of the overall optical system is suppressed from being too large, and the field curvature and the distortion is favorably corrected.

The conditional expression (6) defines a condition for effectively achieving suppression of tolerance sensitivity and the aberrations, and shortening of the total track length, based on a ratio of the focal length of the second lens and the focal length of the overall optical system. When the conditional expression (6) is satisfied, the positive refractive power of the second lens is suppressed from being large, and the tolerance sensitivity, spherical aberration and coma aberration occurred at the second lens is suppressed. When the positive refractive power of the second lens is suppressed from being small, composite principal points from the second lens to the fourth lens are moved toward the object side, and the total track length is shortened.

The conditional expression (7) defines a condition for effectively achieving favorable correction of chromatic aberration and suppression of tolerance sensitivity and the aberrations, based on a ratio of the focal length of the third lens and the focal length of the overall optical system. When the conditional expression (7) is satisfied, the negative refractive power of the third lens is suppressed from being small and chromatic aberration is favorably corrected. Additionally, the negative refractive power of the third lens is suppressed from being large and the tolerance sensitivity and the aberrations are suppressed.

The conditional expression (8) defines a condition for effectively achieving suppression of tolerance sensitivity and shortening of the total track length, based on a ratio of the focal length of the fourth lens and the focal length of the overall optical system. When the conditional expression (8) is satisfied, the positive refractive power of the fourth lens is suppressed from being large and the tolerance sensitivity is suppressed. Additionally, the positive refractive power of the fourth lens is suppressed from being small and the total track length is shortened.

The conditional expression (9) defines a condition for effectively achieving favorable correction of chromatic aberration and shortening of the total track length, based on a ratio of the focal length of the fifth lens and the focal length of the overall optical system. When the conditional expression (9) is satisfied, the negative refractive power of the fifth lens is suppressed from being small and chromatic aberration is favorably corrected. Additionally, the negative refractive power of the fifth lens is suppressed from being large and the total track length is shortened.

The conditional expression (10) defines a condition for effectively achieving ensuring the back focus and shortening of the total track length, based on a ratio of the focal length of the sixth lens and the focal length of the overall optical system. When the conditional expression (10) is satisfied, the negative refractive power of the sixth lens is suppressed from being small and the back focus is ensured. Additionally, the negative refractive power of the sixth lens is suppressed from being large and the total track length is shortened.

According to the imaging lens having the above structure, it is preferable that a below conditional expression (11) is satisfied:

$$1.0 < f456/f < 2.5 \qquad (11)$$

where f456: a composite focal length of the fourth lens, the fifth lens and the sixth lens, f: a focal length of the overall optical system.

The conditional expression (11) defines a condition for effectively achieving favorable correction of the field curvature and shortening of the total track length, based on a ratio of the composite focal length of the fourth lens, the fifth lens and the sixth lens and the focal length of the overall optical system. When the conditional expression (11) is satisfied, the field curvature is favorably corrected and the total track length is shortened.

According to the imaging lens having the above structure, it is preferable that a below conditional expression (12) is satisfied:

$$0.2 < t1/f < 0.6 \qquad (12)$$

where t1: a distance along the optical axis between the first lens and the second lens, f: a focal length of the overall optical system.

The conditional expression (12) defines a condition for effectively achieving favorable correction of the aberrations and low-profileness, based on a ratio of distance along the optical axis between the first lens and the second lens and the focal length of the overall optical system. When the conditional expression (12) is satisfied, design freedom of aspheric surface of the first lens is ensured, and the aberrations are favorably corrected and the total track length is shortened.

According to the imaging lens having the above structure, it is preferable that a below conditional expression (13) is satisfied to obtain the imaging lens achieving the wide field of view and favorably correcting aberrations:

$$0.5 < CA1/ih < 2.0 \qquad (13)$$

where

CA1: an effective diameter of an object-side surface of the first lens,

Ih: a maximum image height.

The conditional expression (13) defines a condition for effectively achieving the wide field of view and control of the light ray incident angle to the image sensor, based on a ratio of the maximum image height and the effective diameter of the object-side surface of the first lens. When the conditional expression (13) is satisfied, the proper effective diameter of an object-side surface of the first lens against the image sensor is obtained. Therefore, the wide field of view and control of the light ray incident angle to the image sensor can be easily achieved.

According to the imaging lens having the above structure, it is preferable that below conditional expressions (14) and (15) is satisfied:

$$0.05 < SAG\ L1F/CA1 < 0.50 \qquad (14)$$

$$0.05 < SAG\ L1R/CA2 < 0.50 \qquad (15)$$

where

SAG L1F: an amount of sag at the peripheral area of the effective diameter of the object-side surface of the first lens, SAG L1R: an amount of sag at the peripheral area of the effective diameter of the image-side surface of the first lens, CA1: an effective diameter of the object-side surface of the first lens, CA2: an effective diameter of the image-side surface of the first lens.

The conditional expression (14) defines a condition for more improving facilitation of the wide field of view and manufacturing. When the conditional expression (14) is satisfied, the proper object-side surface of the first lens is obtained, and achieving the wide field of view and manufacturing are more easily made.

The conditional expression (15) defines a condition for more improving facilitation of the wide field of view and manufacturing. When the conditional expression (15) is satisfied, while maintaining the proper angle of the right lay emitted from the first lens, the right lay enters the second lens. Accordingly, the wide field of view can be easily achieved. Furthermore, uneven thickness of the first lens is suppressed and manufacturing is facilitated.

Effect of Invention

According to the present invention, there is provided a compact imaging lens with high resolution which effectively achieves low-profileness while maintaining the wide field of view, and favorably corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5, 7, 9 and 11 are schematic views showing the general configurations of the imaging lenses in Examples 1 to 6 according to the embodiments of the present invention, respectively. Since all these examples have the same basic lens configuration, the general configuration of an imaging lens according to this embodiment is explained below mainly referring to the schematic view of Example 1.

Figure 1:
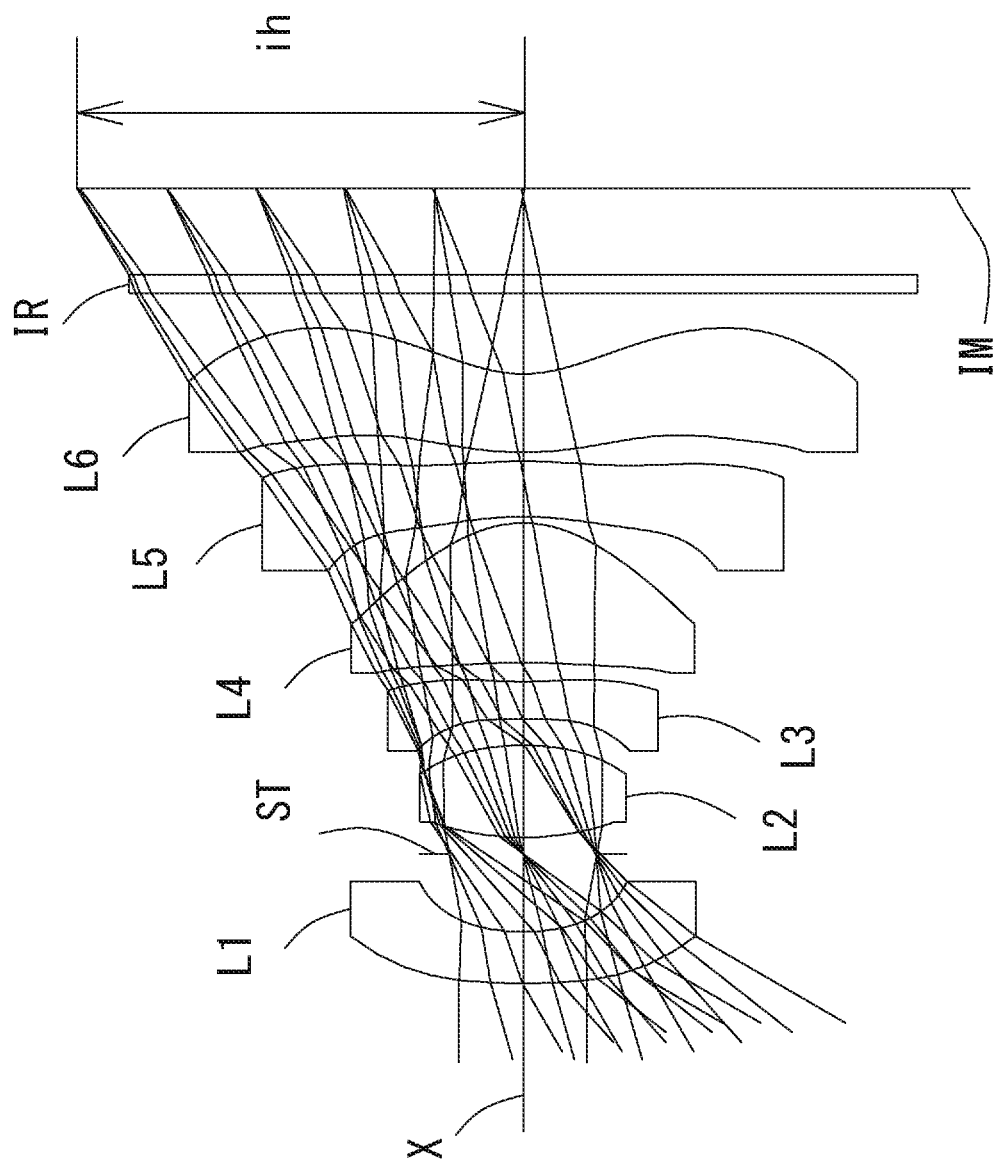
FIG. 1 is a schematic view showing a general configuration of an imaging lens in Example 1 according to the present invention.

As shown in FIG. 1, the imaging lens according to this embodiment forms an image of an object on an image sensor, and comprises in order from an object side to an image side, a first lens L1 having negative refractive power and a concave surface facing an image side near an optical axis X, a second lens L2 having positive refractive power, a third lens L3, a fourth lens L4 having positive refractive power, a fifth lens L5 having negative refractive power as a double-sided aspheric lens, and a sixth lens L6 as a double-sided aspheric lens which has a concave surface near the optical axis X and at least one pole point at an off-axial point (namely, away from the optical axis) on the image-side surface.

A filter IR such as an IR cut filter and a cover glass is located between the sixth lens L6 and an image plane IM. The filter IR is omissible.

The first lens L1 is a meniscus lens which has the image-side surface being concave near the optical axis X. Thus configured, a light ray is capable of entering from wide angles, and while a proper angle of the right lay emitted from the first lens Li, the right lay enters the second lens L2. The first lens L1 is required to have the image-side surface being concave near the optical axis X. Additionally, as shown in Example 3 in FIG. 5, the first lens L1 may have a biconcave shape having both the object-side and the image-side surfaces being concave near the optical axis X, or as shown in Example 5 in FIG. 9, may have the object-side surface being plane and the image-side surface being concave near the optical axis X.

The second lens L2 has a biconvex shape having both the object-side and image-side surfaces being convex near the optical axis X. The second lens L2 contributes to achieve low-profileness.

The third lens L3 has negative refractive power and a biconcave shape having both the object-side and the image-side surfaces being concave near the optical axis X. The third lens L3 corrects spherical aberration and chromatic aberration occurred at the first lens and the second lens. The third lens L3 is required to have the image-side surface being concave near the optical axis X, and as shown in Example 5 in FIG. 9, the third lens L3 may be a meniscus lens having the convex surface facing the object side near the optical axis X. Furthermore, the third lens L3 may have the object-side surface being plane.

The fourth lens L4 is a meniscus lens having the object-side surface being concave and the image-side surface being convex near the optical axis X. By properly striking a balance between the refractive power of the fourth lens L4 and the refractive power of the second lens L2, the low-profileness is achieved, and astigmatism and field curvature are corrected. The fourth lens L4 is required to have the image-side surface being convex near the optical axis X, and as shown in Example 5 in FIG. 9, may have a biconvex shape having both the object-side and the image-side surfaces being convex near the optical axis X.

The fifth lens L5 is a meniscus lens having the object-side surface being concave and the image-side surface being convex near the optical axis X. The fifth lens L5 has negative refractive power and corrects the chromatic aberration. The fifth lens L5 is a double-sided aspheric lens, and controls the light ray incident angle to the image sensor and favorably corrects distortion. As shown in Example 2 in FIG. 3, the fifth lens L5 may be a biconcave lens having both the object-side and the image-side surfaces being concave near the optical axis X. Additionally, the fifth lens L5 may have either one of the object-side surface and the image-side surface being plane near the optical axis.

The sixth lens L6 has negative refractive power. Furthermore, the sixth lens L6 is a meniscus lens having the object-side surface being convex near the optical axis X. The sixth lens L6 is a double-sided aspheric lens, and the aspheric surface on the image side has a pole point and changes to the convex surface at an area apart from the optical axis. Thus having such aspheric surfaces, together with the fifth lens, the sixth lens L6 also controls the light ray incident angle to the image sensor and favorably corrects distortion.

The imaging lens according to the present embodiments satisfies a below conditional expression (a) and the imaging lens being sufficiently made low-profile is obtained:

$$TTL/2ih \leq 1.1 \quad (a)$$

where
TTL: the total track length,
ih: a maximum image height.

The imaging lens according to the present embodiments satisfies a below conditional expression (1), and the imaging lens sufficiently achieving the wide field of view is obtained:

$$\omega \geq 45° \quad (1)$$

where
ω: a half field of view.

The imaging lens according to the present embodiments satisfies a below conditional expression (2), and the wide field of view is achieved and manufacturing is facilitated:

$$0.1 < SAG\ L1R/r2 < 0.6 \quad (2)$$

where
SAG L1R: an amount of sag at the peripheral area of the effective diameter of the image-side surface of the first lens,
r2: the curvature radius of the image-side surface of the first lens.

Regarding the conditional expression (2), a below conditional expression (2a) is more preferable, and a conditional expression (2b) is particularly preferable:

$$0.1 < SAG\ L1R/r2 < 0.55 \quad (2a)$$

$$0.15 < SAG\ L1R/r2 < 0.5. \quad (2b)$$

The imaging lens according to the present embodiments satisfies a below conditional expression (3), and the wide field of view is achieved and aberrations are favorably corrected:

$$0.5 < r2/f < 1.5 \quad (3)$$

where
r2: the curvature radius of the image-side surface of the first lens,
f: the focal length of the overall optical system.

Regarding the conditional expression (3), a below conditional expression (3a) is more preferable, and a conditional expression (3b) is particularly preferable:

$$0.6 < r2/f < 1.3 \quad (3a)$$

$$0.65 < r2/f < 1.15. \quad (3b)$$

The imaging lens according to the present embodiments satisfies a below conditional expression (4), and relationship of a focal length of the second lens L2 and a focal length of the fourth lens L4 is properly defined to effectively achieve proper correction of the astigmatism and the field curvature:

$$f2-f4 > 0 \quad (4)$$

where
f2: the focal length of the second lens,
f4: the focal length of the fourth lens.

The imaging lens according to the present embodiments satisfies a below conditional expression (5), and a ratio of the focal length of the first lens L1 and the focal length of the overall optical system is properly defined to effectively achieve facilitation of the wide field of view and favorable correction of the field curvature and the distortion:

$$-2.5 < f1/f < -1.0 \quad (5)$$

where
f1: the focal length of the first lens,
f: the focal length of the overall optical system.

Regarding the conditional expression (5), a below conditional expression (5a) is more preferable, and a conditional expression (5b) is particularly preferable:

$$-2.3 < f1/f < -1.3 \quad (5a)$$

$$-2.2 < f1/f < -1.5 \quad (5b)$$

The imaging lens according to the present embodiments satisfies a below conditional expression (6), and a ratio of the focal length of the second lens L2 and the focal length of the overall optical system is properly defined to effectively achieve suppression of tolerance sensitivity and the aberrations and shortening of the total track length:

$$0.5 < f2/f < 1.5 \quad (6)$$

where
f2: the focal length of the second lens,
f: the focal length of the overall optical system.

Regarding the conditional expression (6), a below conditional expression (6a) is more preferable, and a conditional expression (6b) is particularly preferable:

$$0.7 < f2/f < 1.3 \quad (6a)$$

$$0.8 < f2/f < 1.2. \quad (6b)$$

The imaging lens according to the present embodiments satisfies a below conditional expression (7), and a ratio of the focal length of the third lens L3 and the focal length of the overall optical system is properly defined to effectively achieve favorable correction of the chromatic aberration and suppression of the tolerance sensitivity and the aberrations:

$$-6.0 < f3/f < -1.5 \quad (7)$$

where
f3: the focal length of the third lens,
f: the focal length of the overall optical system.

Regarding the conditional expression (7), a below conditional expression (7a) is more preferable, and a conditional expression (7b) is particularly preferable:

$$-5.5 < f3/f < -1.8 \quad (7a)$$

$$-5.3 < f3/f < -2.0. \quad (7b)$$

The imaging lens according to the present embodiments satisfies a below conditional expression (8), and a ratio of the focal length of the fourth lens L4 and the focal length of the overall optical system is properly defined to effectively achieve suppression of the tolerance sensitivity and shortening of the total track length:

$$0.5 < f4/f < 1.5 \quad (8)$$

where
f4: the focal length of the fourth lens,
f: the focal length of the overall optical system.

Regarding the conditional expression (8), a below conditional expression (8a) is more preferable, and a conditional expression (8b) is particularly preferable:

$$0.5 < f4/f < 1.2 \quad (8a)$$

$$0.6 < f4/f < 1.0. \quad (8b)$$

The imaging lens according to the present embodiments satisfies a below conditional expression (9), and a ratio of the focal length of the fifth lens L5 and the focal length of the overall optical system is properly defined to effectively achieve favorable correction of the chromatic aberration and shortening of the total track length:

$$-6.0 < f5/f < -1.5 \quad (9)$$

where
f5: the focal length of the fifth lens,
f: the focal length of the overall optical system.

Regarding the conditional expression (9), a below conditional expression (9a) is more preferable, and a conditional expression (9b) is particularly preferable:

$$-5.0 < f5/f < -1.7 \quad (9a)$$

$$-4.5 < f5/f < -1.8. \quad (9b)$$

The imaging lens according to the present embodiments satisfies a below conditional expression (10), and a ratio of the focal length of the sixth lens L6 and the focal length of the overall optical system is properly defined to effectively achieve ensuring a back focus and shortening of the total track length:

$$-2.5 < f6/f < -1.0 \quad (10)$$

where
f6: the focal length of the sixth lens,
f: the focal length of the overall optical system.

Regarding the conditional expression (10), a below conditional expression (10a) is more preferable, and a conditional expression (10b) is particularly preferable:

$$-2.3 < f6/f < -1.2 \quad (10a)$$

$$-2.1 < f6/f < -1.2. \quad (10b)$$

The imaging lens according to the present embodiments satisfies a below conditional expression (11), and a ratio of the composite focal length of the fourth lens, the fifth lens and the sixth lens and the focal length of the overall optical system is properly defined to effectively achieve favorable correction of the field curvature and shortening of the total track length:

$$1.0 < f456/f < 2.5 \quad (11)$$

where
f456: the composite focal length of the fourth lens, the fifth lens and the sixth lens,
f: the focal length of the overall optical system.

Regarding the conditional expression (11), a below conditional expression (11a) is more preferable, and a conditional expression (11b) is particularly preferable:

$$1.2 < f456/f < 2.3 \quad (11a)$$

$$1.3 < f456/f < 2.0. \quad (11b)$$

The imaging lens according to the present embodiments satisfies a below conditional expression (12), which is defined to effectively achieve favorable correction of the aberrations and shortening of total track length:

$$0.2 < t1/f < 0.6 \quad (12)$$

where
t1: the distance along the optical axis between the first lens and the second lens,
f: the focal length of the overall optical system.

Regarding the conditional expression (12), a below conditional expression (12a) is more preferable, and a conditional expression (12b) is particularly preferable:

$$0.25 < t1/f < 0.58 \quad (12a)$$

$$0.28 < t1/f < 0.55. \quad (12b)$$

The imaging lens according to the present embodiments satisfies a below conditional expression (13), which is defined to effectively achieve the wide field of view and control of the light ray incident angle to the image sensor:

$$0.5 < CA1/ih < 2.0 \quad (13)$$

where
CA1: the effective diameter of an object-side surface of the first lens,
Ih: the maximum image height.

Regarding the conditional expression (13), a below conditional expression (13a) is more preferable, and a conditional expression (13b) is particularly preferable:

$$0.6 < CA1/ih < 1.7 \quad (13a)$$

$$0.7 < CA1/ih < 1.5. \quad (13b)$$

The imaging lens according to the present embodiments satisfies a below conditional expression (14), which is defined to effectively achieve facilitation of the wide field of view and manufacturing:

$$0.05 < SAG\ L1F/CA1 < 0.50 \quad (14)$$

where
SAG L1F: an amount of sag at the peripheral area of the effective diameter of the object-side surface of the first lens,
CA1: the effective diameter of the object-side surface of the first lens.

Regarding the conditional expression (14), a below conditional expression (14a) is more preferable, and a conditional expression (14b) is particularly preferable:

$$0.06 < SAG\ L1F/CA1 < 0.30 \quad (14a)$$

$$0.07 < SAG\ L1F/CA1 < 0.20. \quad (14b)$$

The imaging lens according to the present embodiments satisfies a below conditional expression (15), which is defined to effectively achieve facilitation of the wide field of view and manufacturing:

$$0.05 < SAG\ L1R/CA2 < 0.50 \quad (15)$$

where
SAG L1R: an amount of sag at the peripheral area of the effective diameter of the image-side surface of the first lens,
CA2: the effective diameter of the image-side surface of the first lens.

Regarding the conditional expression (15), a below conditional expression (15a) is more preferable, and a conditional expression (15b) is particularly preferable:

$$0.10 < SAG\ L1R/CA2 < 0.45 \quad (15a)$$

$$0.20 < SAG\ L1R/CA2 < 0.40. \quad (15b)$$

The invention is not limited to the embodiments specifically disclosed, and substitutions, modifications, and variations may be made to the present invention without departing from the object of the invention.

Regarding the imaging lens according to the present embodiments, it is preferable to satisfy all of conditional expressions. By satisfying the conditional expression individually, operational advantage corresponding to each conditional expression can be obtained.

In this embodiment, the aspheric shapes of the surfaces of the aspheric lens are expressed by Equation 1, where Z denotes an axis in the optical axis direction, H denotes a height perpendicular to the optical axis, R denotes a curvature radius, k denotes a conic constant, and A4, A6, A8, A10, A12, A14, and A16 denote aspheric surface coefficients.

$$Z = \frac{\frac{H^2}{R}}{1+\sqrt{1-(k+1)\frac{H^2}{R^2}}} + A_4 H^4 + A_6 H^6 +$$

$$A_8 H^8 + A_{10} H^{10} + A_{12} H^{12} + A_{14} H^{14} + A_{16} H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, and TTL denotes the total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

EXAMPLE 1

The basic lens data is shown below in Table 1.

Example 1
Unit mm f = 1.74
Fno = 2.42
ω (°) = 59.9
ih = 2.49
TTL = 4.42

Surface Data

| Surface Number i | Curvature Radius r | Surface Distance d | Refractive Index Nd | Abbe Number vd |
|---|---|---|---|---|
| (Object) | Infinity | Infinity | | |
| 1* | 6.772 | 0.288 | 1.5443 | 55.86 |
| 2* | 1.205 | 0.436 | | |
| 3 (Stop) | Infinity | 0.092 | | |
| 4* | 1.634 | 0.515 | 1.5443 | 55.86 |
| 5* | −1.547 | 0.149 | | |
| 6* | −9.053 | 0.210 | 1.6510 | 21.52 |
| 7* | 3.195 | 0.105 | | |
| 8* | −4.335 | 0.782 | 1.5348 | 55.66 |
| 9* | −0.632 | 0.035 | | |
| 10* | −1.991 | 0.310 | 1.6391 | 23.25 |
| 11* | −3.546 | 0.050 | | |
| 12* | 1.778 | 0.440 | 1.5348 | 55.66 |
| 13* | 0.742 | 0.500 | | |
| 14 | Infinity | 0.110 | 1.5168 | 64.20 |
| 15 | Infinity | 0.431 | | |
| Image Plane | Infinity | | | |

Constituent Lens Data

| Lens | Start Surface | Focal Length | | |
|---|---|---|---|---|
| 1 | 1 | f1 = −2.74 | f456 = 2.43 | |
| 2 | 4 | f2 = 1.55 | CA1 = 1.95 | |
| 3 | 6 | f3 = −3.60 | CA2 = 1.17 | |
| 4 | 8 | f4 = 1.29 | SAG L1F = 0.27 | |
| 5 | 10 | f5 = −7.70 | SAG L1R = 0.28 | |
| 6 | 12 | f6 = −2.80 | | |

Aspheric Surface Data

| | First Surface | Second Surface | Fourth Surface | Fifth Surface | Sixth Surface | Seventh Surface |
|---|---|---|---|---|---|---|
| k | 0.00000E+00 | 2.83986E+00 | 2.47910E+00 | 0.00000E+00 | 0.00000E+00 | 7.61528E−01 |
| A4 | 4.40403E−01 | 5.83114E−01 | 2.74129E−02 | −6.26256E−01 | −1.60329E+00 | −8.70183E−01 |
| A6 | −4.84282E−01 | 6.00713E−01 | −3.75983E−01 | 8.49792E−01 | 5.38048E−01 | 1.37465E+00 |
| A8 | 4.15053E−01 | −6.67438E+00 | 9.66005E−01 | −1.12126E+00 | 4.19575E+00 | −1.57055E+00 |
| A10 | −1.52367E−01 | 1.90574E+01 | −1.92308E+00 | 4.11207E+00 | −1.29396E+01 | 8.56445E−01 |
| A12 | −4.61470E−03 | −1.21594E+01 | 0.00000E+00 | 0.00000E+00 | 1.33176E+01 | −1.49455E−02 |
| A14 | 0.00000E+00 | 0.00000E+00 | 0.00000E+00 | 0.00000E+00 | 0.00000E+00 | 0.00000E+00 |
| A16 | 0.00000E+00 | 0.00000E+00 | 0.00000E+00 | 0.00000E+00 | 0.00000E+00 | 0.00000E+00 |

| | Eighth Surface | Ninth Surface | Tenth Surface | Eleventh Surface | Twelfth Surface | Thirteenth Surface |
|---|---|---|---|---|---|---|
| k | 0.00000E+00 | −2.32485E+00 | 0.00000E+00 | 0.00000E+00 | 0.00000E+00 | −4.09446E+00 |
| A4 | 1.74741E−01 | −2.68765E−01 | 1.36592E−01 | 1.83882E−01 | −2.39767E−01 | −2.00244E−01 |
| A6 | −8.87073E−02 | 1.79338E−01 | 7.22718E−01 | 3.28525E−01 | −5.10307E−03 | 1.09283E−01 |
| A8 | 2.58502E−01 | 1.00372E+00 | −1.89771E+00 | −9.50716E−01 | 2.89054E−03 | −4.51186E−02 |
| A10 | −1.87120E+00 | −3.44653E+00 | 1.99535E+00 | 9.08022E−01 | 6.15432E−02 | 9.70167E−03 |

-continued

Example 1
Unit mm

| | | | | | | |
|---|---|---|---|---|---|---|
| A12 | 2.88222E+00 | 5.02706E+00 | −1.31341E+00 | −4.35087E−01 | −4.75942E−02 | −1.97692E−04 |
| A14 | −1.47680E+00 | −3.86363E+00 | 5.11826E−01 | 1.05641E−01 | 1.36563E−02 | −2.96542E−04 |
| A16 | 0.00000E+00 | 1.30044E+00 | −8.32630E−02 | −1.04117E−02 | −1.45718E−03 | 3.63276E−05 |

The imaging lens in Example 1 satisfies conditional expressions (a) and (1) to (15) as shown in Table 7.

Figure 2:
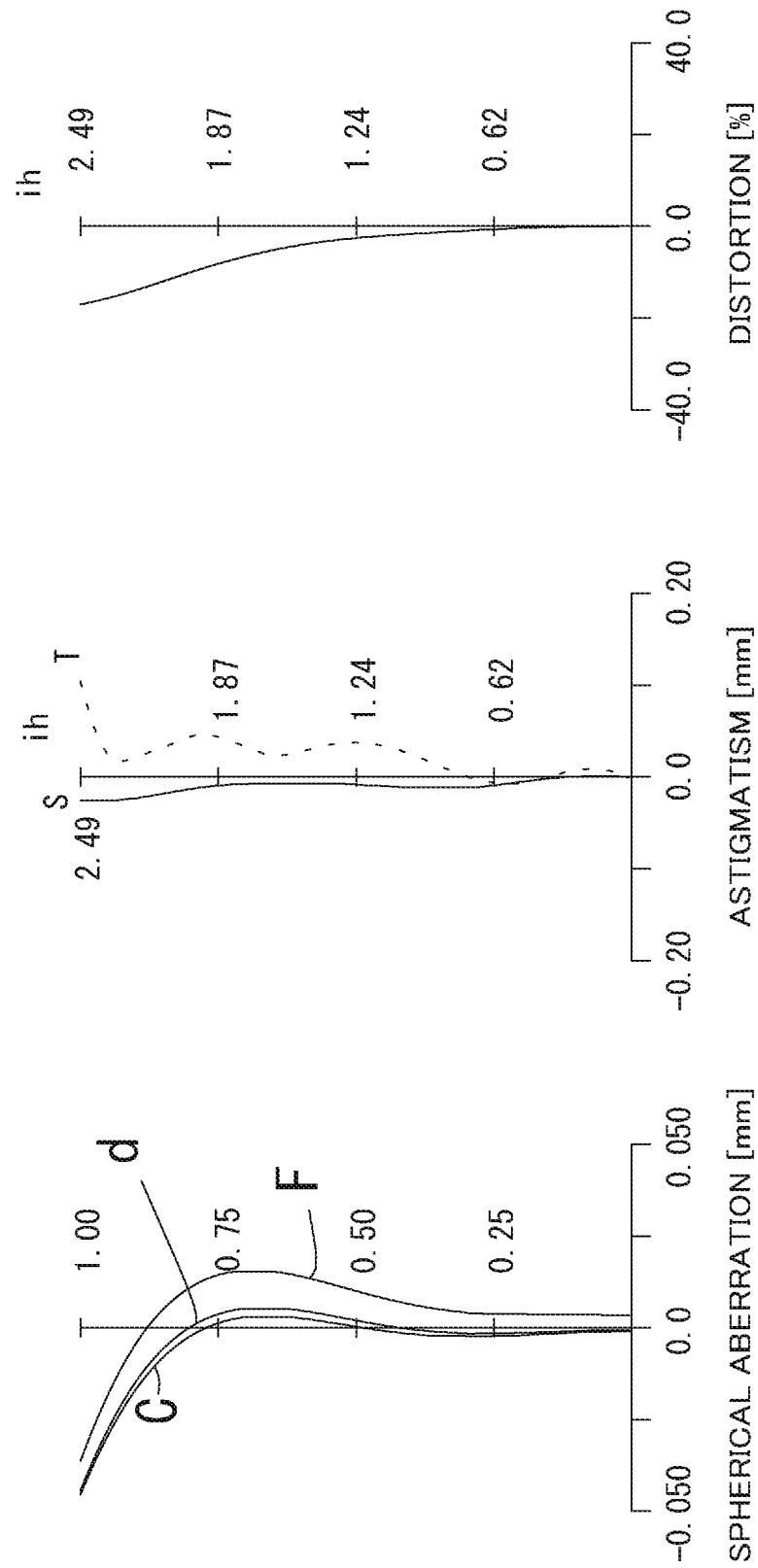
FIG. 2 shows spherical aberration, astigmatism, and distortion of the imaging lens in Example 1 according to the present invention.
Figure 3:
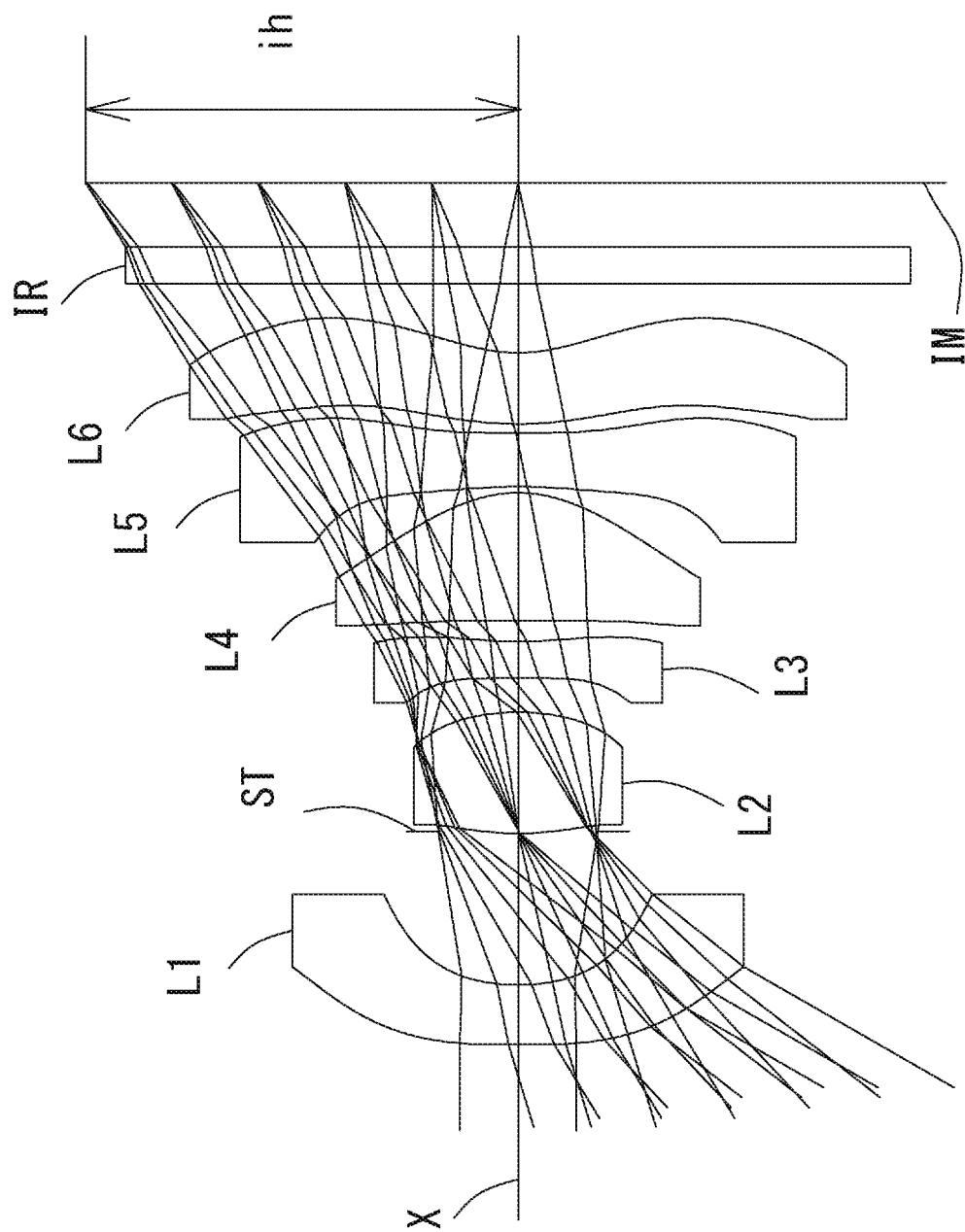
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S and on tangential image surface T (same as FIG. 4, FIG. 6, FIG. 8, FIG. 10 and FIG. 12). As shown in FIG. 2, each aberration is corrected favorably.

EXAMPLE 2

The basic lens data is shown below in Table 2.

Example 2
Unit mm $f = 1.63$
$Fno = 2.39$
$\omega$ (°) $= 60.1$
$ih = 2.49$
$TTL = 4.90$ Surface Data

| Surface Number i | Curvature Radius r | Surface Distance d | Refractive Index Nd | Abbe Number vd |
|---|---|---|---|---|
| (Object) | Infinity | Infinity | | |
| 1* | 11.809 | 0.345 | 1.5348 | 55.66 |
| 2* | 1.202 | 0.883 | | |
| 3 (Stop) | Infinity | −0.009 | | |
| 4* | 1.827 | 0.697 | 1.5443 | 55.86 |
| 5* | −1.405 | 0.198 | | |
| 6* | 23.439 | 0.210 | 1.6503 | 21.54 |
| 7* | 2.312 | 0.120 | | |
| 8* | −159.598 | 0.737 | 1.5348 | 55.66 |
| 9* | −0.747 | 0.035 | | |
| 10* | −2.987 | 0.310 | 1.6391 | 23.25 |
| 11* | 82.236 | 0.051 | | |
| 12* | 1.977 | 0.410 | 1.5348 | 55.66 |
| 13* | 0.862 | 0.250 | | |
| 14 | Infinity | 0.210 | 1.5168 | 64.20 |
| 15 | Infinity | 0.520 | | |
| Image Plane | Infinity | | | |

Constituent Lens Data

| Lens | Start Surface | Focal Length | | |
|---|---|---|---|---|
| 1 | 1 | f1 = −2.53 | f456 = 3.13 | |
| 2 | 4 | f2 = 1.58 | CA1 = 2.69 | |
| 3 | 6 | f3 = −3.96 | CA2 = 1.59 | |
| 4 | 8 | f4 = 1.40 | SAG L1F = 0.48 | |
| 5 | 10 | f5 = −4.50 | SAG L1R = 0.56 | |
| 6 | 12 | f6 = −3.27 | | |

Aspheric Surface Data

| | First Surface | Second Surface | Fourth Surface | Fifth Surface | Sixth Surface | Seventh Surface |
|---|---|---|---|---|---|---|
| k | 0.00000E+00 | 5.31502E−01 | −3.36243E+00 | 0.00000E+00 | 0.00000E+00 | 4.00696E−01 |
| A4 | 3.71110E−01 | 4.86718E−01 | −4.24428E−02 | −4.06448E−01 | −8.91305E−01 | −5.97792E−01 |
| A6 | −3.49809E−01 | 1.00383E+00 | −6.67505E−02 | −3.11336E+00 | −3.19409E−01 | 5.61063E−01 |
| A8 | 2.54180E−01 | −5.01632E+00 | 2.84787E+00 | 1.11316E+00 | 2.99668E+00 | −1.48239E+00 |
| A10 | −1.06048E−01 | 1.08784E+01 | −1.37578E+01 | −3.20483E+00 | −8.05660E+00 | −4.60255E−01 |
| A12 | 1.68999E−02 | −8.02150E+00 | 0.00000E+00 | 0.00000E+00 | 7.22205E+00 | 3.77686E−01 |
| A14 | 0.00000E+00 | 0.00000E+00 | 0.00000E+00 | 0.00000E+00 | 0.00000E+00 | 0.00000E+00 |
| A16 | 0.00000E+00 | 0.00000E+00 | 0.00000E+00 | 0.00000E+00 | 0.00000E+00 | 0.00000E+00 |

-continued

Example 2
Unit mm

|   | Eighth Surface | Ninth Surface | Tenth Surface | Eleventh Surface | Twelfth Surface | Thirteenth Surface |
|---|---|---|---|---|---|---|
| k | 0.00000E+00 | −3.02592E+00 | 0.00000E+00 | 0.00000E+00 | 0.00000E+00 | −6.45245E+00 |
| A4 | −1.45604E−01 | −1.67774E−01 | 3.05311E−01 | 4.19085E−01 | −1.74202E−01 | −1.28923E−01 |
| A6 | 7.35653E−01 | −3.02623E−02 | −3.17984E−01 | −6.87332E−01 | −2.99644E−03 | 4.27165E−02 |
| A8 | −1.65845E+00 | 1.20562E+00 | −8.51208E−02 | 5.47065E−01 | 1.37171E−03 | −1.64241E−02 |
| A10 | 2.04582E+00 | −2.98400E+00 | 2.99387E−01 | −2.73205E−01 | 2.36033E−02 | 4.82842E−03 |
| A12 | −1.44250E+00 | 3.57018E+00 | −2.60502E−01 | 8.64238E−02 | −1.47522E−02 | −3.35157E−04 |
| A14 | 3.84760E−01 | −2.16250E+00 | 1.03329E−01 | −1.56533E−02 | 3.42094E−03 | −1.24427E−04 |
| A16 | 0.00000E+00 | 5.29046E−01 | −1.50137E−02 | 1.21529E−03 | −2.95009E−04 | 1.68283E−05 |

The imaging lens in Example 2 satisfies conditional expressions (a) and (1) to (15) as shown in Table 7.

Figure 4:
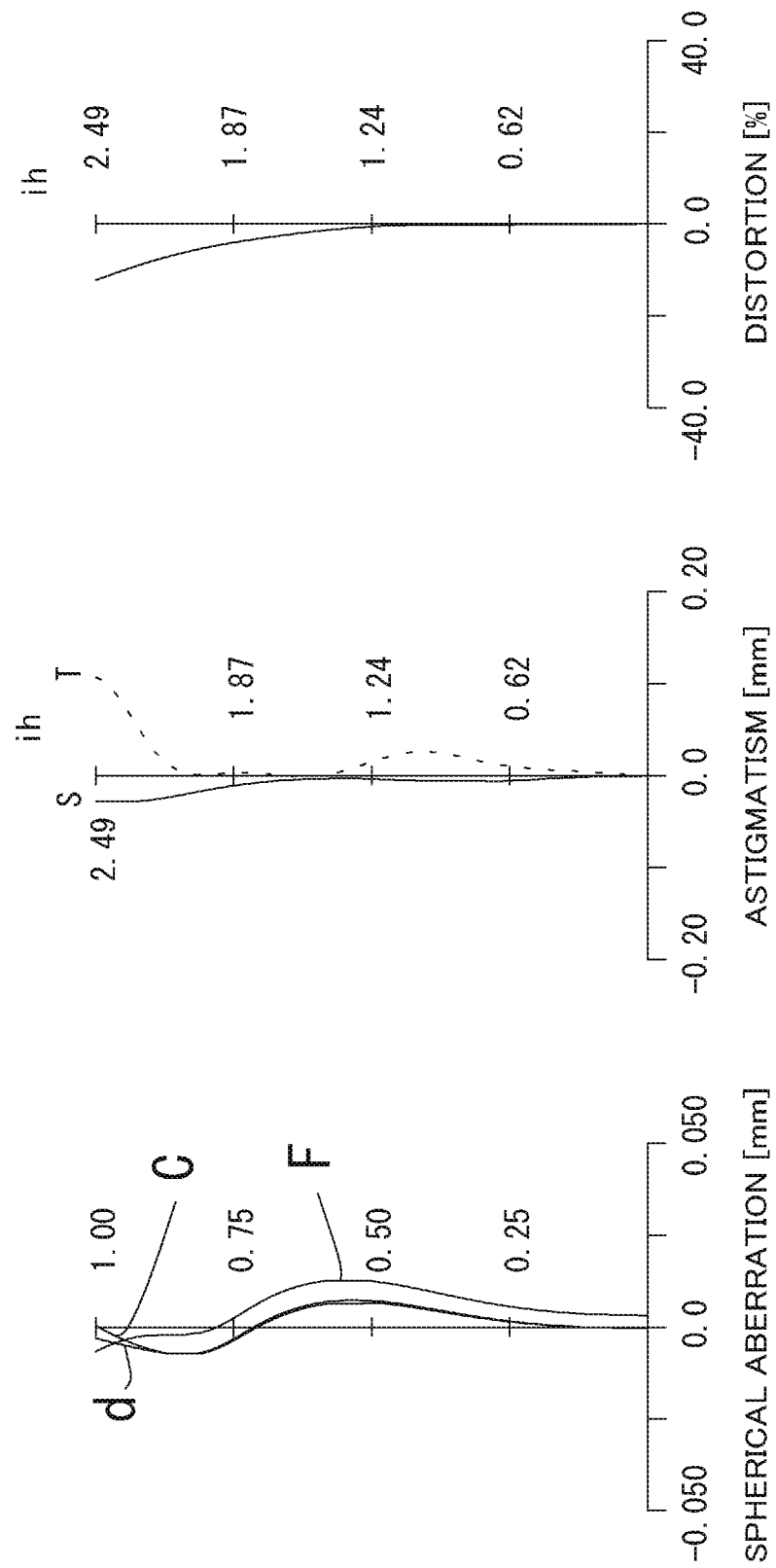
FIG. 4 shows spherical aberration, astigmatism, and distortion of the imaging lens in Example 2 according to the present invention.
Figure 5:
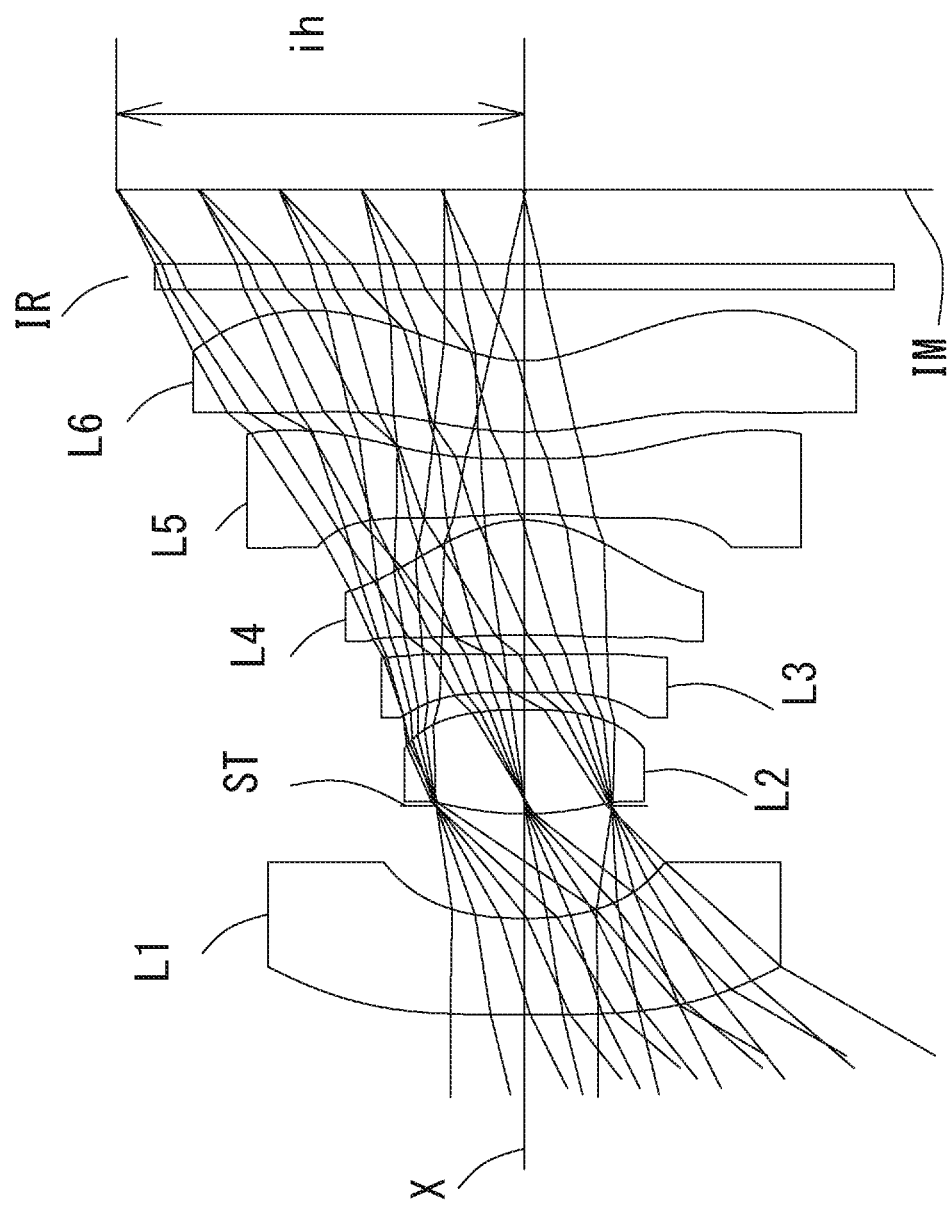
FIG. 5 is a schematic view showing the general configuration of an imaging lens in Example 3 according to the present invention.

FIG. 4 shows spherical aberration (mm), astigmatism (mm), and distortion (%) of the imaging lens in Example 2. As shown in FIG. 4, each aberration is corrected favorably.

EXAMPLE 3

The basic lens data is shown below in Table 3.

Example 3
Unit mm f = 1.89
Fno = 2.25
ω (°) = 60.0
ih = 2.28
TTL = 4.57

Surface Data

| Surface Number i | Curvature Radius r | Surface Distance d | Refractive Index Nd | Abbe Number vd |
|---|---|---|---|---|
| (Object) | Infinity | Infinity | | |
| 1* | −1984.021 | 0.538 | 1.5348 | 55.66 |
| 2* | 1.962 | 0.629 | | |
| 3 (Stop) | Infinity | −0.043 | | |
| 4* | 1.754 | 0.584 | 1.5443 | 55.86 |
| 5* | −2.754 | 0.096 | | |
| 6* | −177.042 | 0.210 | 1.6503 | 21.54 |
| 7* | 6.450 | 0.110 | | |
| 8* | −11.527 | 0.645 | 1.5348 | 55.66 |
| 9* | −0.666 | 0.035 | | |
| 10* | −2.640 | 0.310 | 1.6391 | 23.25 |
| 11* | 15.473 | 0.149 | | |
| 12* | 1.966 | 0.398 | 1.5348 | 55.66 |
| 13* | 0.773 | 0.290 | | |
| 14 | Infinity | 0.145 | 1.5168 | 64.20 |
| 15 | Infinity | 0.525 | | |
| Image Plane | Infinity | | | |

Constituent Lens Data

| Lens | Start Surface | Focal Length | | |
|---|---|---|---|---|
| 1 | 1 | f1 = −3.67 | f456 = 3.56 | |
| 2 | 4 | f2 = 2.06 | CA1 = 3.00 | |
| 3 | 6 | f3 = −9.56 | CA2 = 1.62 | |
| 4 | 8 | f4 = 1.29 | SAG L1F = 0.30 | |
| 5 | 10 | f5 = −3.51 | SAG L1R = 0.34 | |
| 6 | 12 | f6 = −2.69 | | |

Aspheric Surface Data

|   | First Surface | Second Surface | Fourth Surface | Fifth Surface | Sixth Surface | Seventh Surface |
|---|---|---|---|---|---|---|
| k | 0.00000E+00 | 0.00000E+00 | 0.00000E+00 | 0.00000E+00 | 0.00000E+00 | 0.00000E+00 |
| A4 | 1.43539E−01 | 3.90095E−01 | 4.33654E−03 | −6.46283E−01 | −8.26642E−01 | −3.86847E−01 |
| A6 | −8.83772E−02 | −2.67894E−01 | −6.41647E−01 | 9.17502E−01 | 4.96005E−01 | 8.88156E−01 |
| A8 | 4.82799E−02 | 6.80042E−01 | 1.97997E+00 | −2.45505E+00 | 1.25283E+00 | −1.51335E+00 |
| A10 | −1.64677E−02 | −3.79474E−01 | −6.35760E+00 | 6.35850E−01 | −7.75115E+00 | 9.44637E−01 |

-continued

Example 3
Unit mm

| | | | | | | |
|---|---|---|---|---|---|---|
| A12 | 2.28611E−03 | 0.00000E+00 | 0.00000E+00 | 0.00000E+00 | 1.05420E+01 | 1.96700E−01 |
| A14 | 0.00000E+00 | 0.00000E+00 | 0.00000E+00 | 0.00000E+00 | 0.00000E+00 | 0.00000E+00 |
| A16 | 0.00000E+00 | 0.00000E+00 | 0.00000E+00 | 0.00000E+00 | 0.00000E+00 | 0.00000E+00 |

| | Eighth Surface | Ninth Surface | Tenth Surface | Eleventh Surface | Twelfth Surface | Thirteenth Surface |
|---|---|---|---|---|---|---|
| k | 0.00000E+00 | −3.16023E+00 | 0.00000E+00 | 0.00000E+00 | 0.00000E+00 | −4.65433E+00 |
| A4 | −2.55928E−01 | −2.54785E−01 | 5.56199E−01 | 4.16255E−01 | −1.72099E−01 | −1.25077E−01 |
| A6 | 1.76492E+00 | 6.34072E−01 | −6.12178E−01 | −5.72207E−01 | −5.63640E−03 | 6.58266E−02 |
| A8 | −4.22142E+00 | −1.33848E−01 | 1.08046E−01 | 3.38187E−01 | −3.18739E−01 | −4.21030E−02 |
| A10 | 5.51485E+00 | −2.34264E+00 | 1.71282E−01 | −8.46553E−02 | 4.51248E−02 | 1.62408E−02 |
| A12 | −4.10168E+00 | 5.71799E+00 | −1.20888E−01 | −6.23633E−03 | −3.21187E−02 | −2.88270E−03 |
| A14 | 1.20191E+00 | −5.45873E+00 | 2.84071E−02 | 8.00436E−03 | 8.84350E−03 | 8.15540E−05 |
| A16 | 0.00000E+00 | 1.87436E+00 | −4.72685E−03 | −1.26107E−03 | −8.93978E−04 | 2.32413E−05 |

The imaging lens in Example 3 satisfies conditional expressions (a) and (1) to (15) as shown in Table 7.

Figure 6:
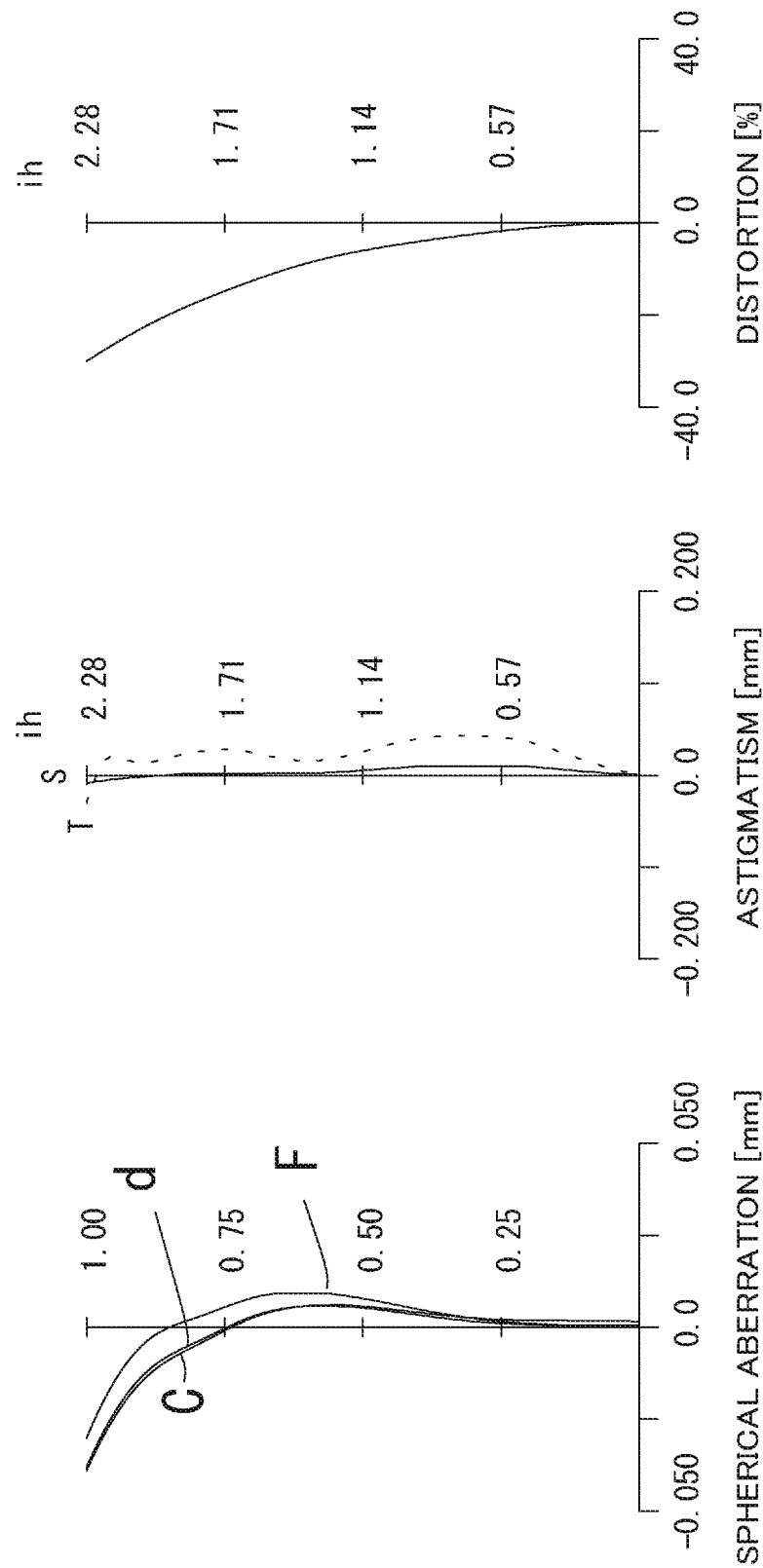
FIG. 6 shows spherical aberration, astigmatism, and distortion of the imaging lens in Example 3 according to the present invention.
Figure 7:
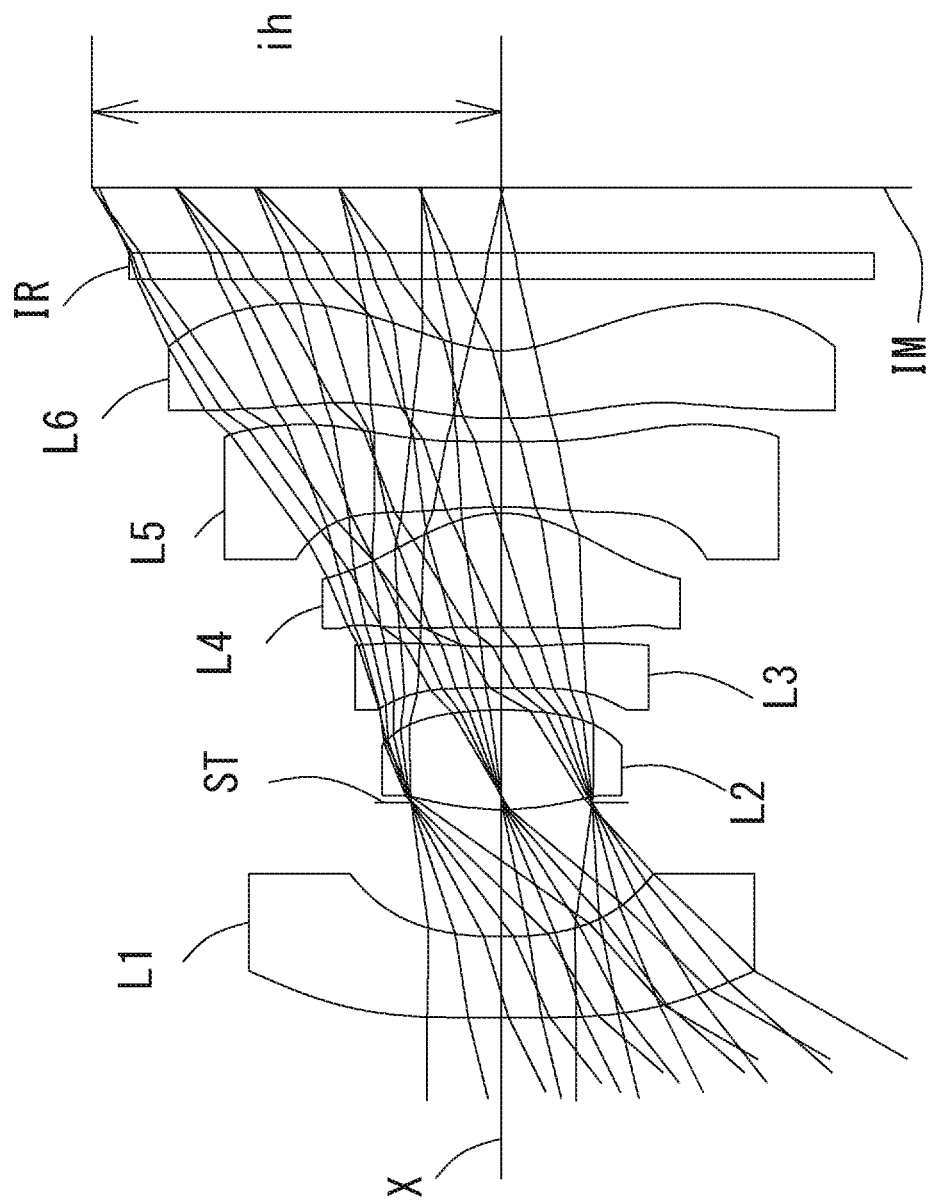
FIG. 7 is a schematic view showing the general configuration of an imaging lens in Example 4 according to the present invention.

FIG. 6 shows spherical aberration (mm), astigmatism (mm), and distortion (%) of the imaging lens in Example 3. As shown in FIG. 6, each aberration is corrected favorably.

EXAMPLE 4

The basic lens data is shown below in Table 4.

Example 4
Unit mm f = 1.91
Fno = 2.24
ω (°) = 60.0
ih = 2.28
TTL = 4.60

Surface Data

| Surface Number i | Curvature Radius r | Surface Distance d | Refractive Index Nd | Abbe Number vd |
|---|---|---|---|---|
| (Object) | Infinity | Infinity | | |
| 1* | −1984.021 | 0.453 | 1.5348 | 55.66 |
| 2* | 2.131 | 0.751 | | |
| 3 (Stop) | Infinity | −0.037 | | |
| 4* | 1.666 | 0.556 | 1.5443 | 55.86 |
| 5* | −2.519 | 0.125 | | |
| 6* | 39.261 | 0.230 | 1.6503 | 21.54 |
| 7* | 3.404 | 0.110 | | |
| 8* | −20.071 | 0.639 | 1.5348 | 55.66 |
| 9* | −0.668 | 0.035 | | |
| 10* | −2.403 | 0.365 | 1.6391 | 23.25 |
| 11* | 90.173 | 0.129 | | |
| 12* | 2.040 | 0.380 | 1.5348 | 55.66 |
| 13* | 0.746 | 0.400 | | |
| 14 | Infinity | 0.145 | 1.5168 | 64.20 |
| 15 | Infinity | 0.368 | | |
| Image Plane | Infinity | | | |

Constituent Lens Data

| Lens | Start Surface | Focal Length | |
|---|---|---|---|
| 1 | 1 | f1 = −3.98 | f456 = 3.58 |
| 2 | 4 | f2 = 1.93 | CA1 = 2.93 |
| 3 | 6 | f3 = −5.75 | CA2 = 1.74 |
| 4 | 8 | f4 = 1.28 | SAG L1F = 0.28 |
| 5 | 10 | f5 = −3.66 | SAG L1R = 0.38 |
| 6 | 12 | f6 = −2.45 | |

Aspheric Surface Data

| | First Surface | Second Surface | Fourth Surface | Fifth Surface | Sixth Surface | Seventh Surface |
|---|---|---|---|---|---|---|
| k | 0.00000E+00 | 0.00000E+00 | 0.00000E+00 | 0.00000E+00 | 0.00000E+00 | 0.00000E+00 |
| A4 | 1.59931E−01 | 3.52166E−01 | −7.06583E−03 | −4.58990E−01 | −7.30950E−01 | −4.33279E−01 |
| A6 | −9.56205E−02 | −1.57245E−01 | −5.21484E−01 | 8.26557E−01 | 4.21595E−01 | 9.06329E−01 |
| A8 | 4.79054E−02 | 3.36255E−01 | 1.45943E+00 | −2.57841E+00 | 1.53818E+00 | −1.47861E+00 |

-continued

Example 4
Unit mm

|     |              |              |              |              |              |              |
| --- | ------------ | ------------ | ------------ | ------------ | ------------ | ------------ |
| A10 | −1.62933E−02 | −1.96624E−01 | −4.66842E+00 | 9.41937E−01  | −8.44883E+00 | 8.22954E−01  |
| A12 | 2.22134E−03  | 0.00000E+00  | 0.00000E+00  | 0.00000E+00  | 1.05420E+01  | 1.96700E−01  |
| A14 | 0.00000E+00  | 0.00000E+00  | 0.00000E+00  | 0.00000E+00  | 0.00000E+00  | 0.00000E+00  |
| A16 | 0.00000E+00  | 0.00000E+00  | 0.00000E+00  | 0.00000E+00  | 0.00000E+00  | 0.00000E+00  |

|     | Eighth Surface | Ninth Surface | Tenth Surface | Eleventh Surface | Twelfth Surface | Thirteenth Surface |
| --- | -------------- | ------------- | ------------- | ---------------- | --------------- | ------------------ |
| k   | 0.00000E+00    | −3.22727E+00  | 0.00000E+00   | 0.00000E+00      | 0.00000E+00     | −4.81957E+00       |
| A4  | −2.00309E−01   | −2.03488E−01  | 5.63669E−01   | 4.07086E−01      | −2.05033E−01    | −1.48101E−01       |
| A6  | 1.71872E+00    | 6.56608E−01   | −6.32707E−01  | −5.74794E−01     | 1.15316E−02     | 7.83579E−02        |
| A8  | −4.22372E+00   | −2.03342E+00  | 7.91350E−02   | 3.38045E−01      | −3.82623E−03    | −4.37351E−02       |
| A10 | 5.54648E+00    | −2.31712E+00  | 1.80417E−01   | −8.42641E−02     | 4.46792E−02     | 1.60705E−02        |
| A12 | −4.10168E+00   | 5.71799E+00   | −1.20888E−01  | −5.92152E−03     | −3.22016E−02    | −2.85642E−03       |
| A14 | 1.20191E+00    | −5.45873E+00  | 2.84071E−02   | 8.02353E−03      | 8.83820E−03     | 1.00351E−04        |
| A16 | 0.00000E+00    | 1.87436E+00   | −4.72685E−03  | −1.30936E−03     | −8.83335E−04    | 1.84999E−05        |

The imaging lens in Example 4 satisfies conditional expressions (a) and (1) to (15) as shown in Table 7.

Figure 8:
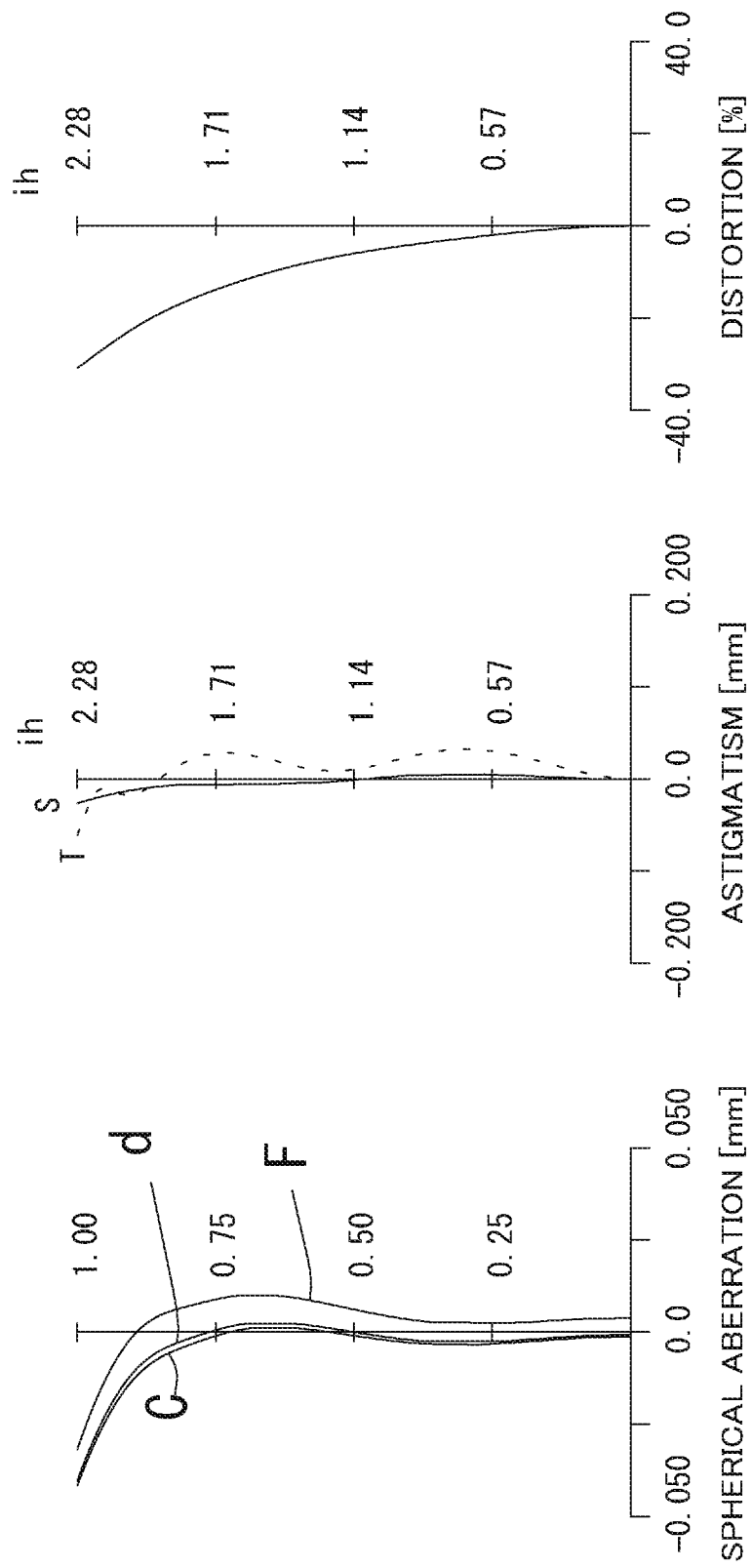
FIG. 8 shows spherical aberration, astigmatism, and distortion of the imaging lens in Example 4 according to the present invention.
Figure 9:
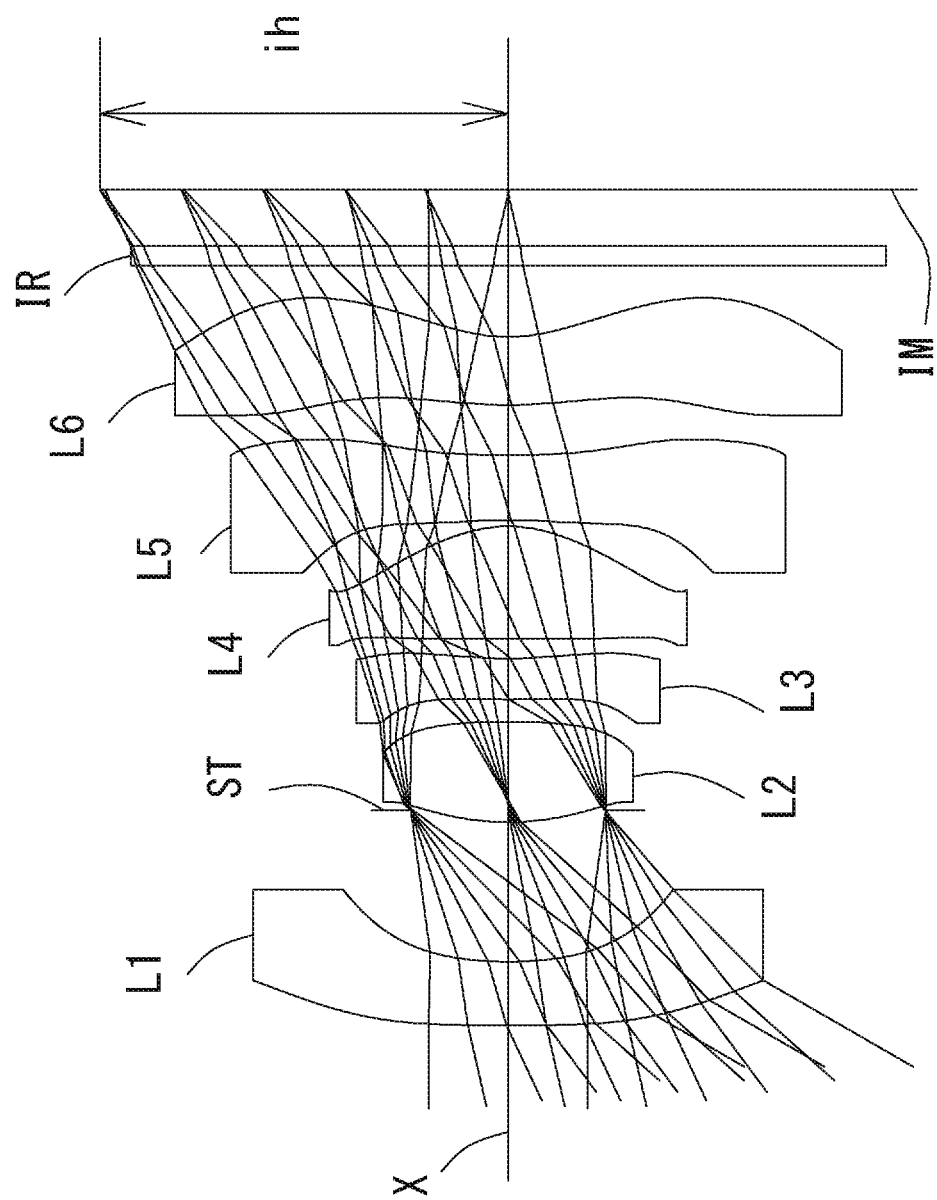
FIG. 9 is a schematic view showing the general configuration of an imaging lens in Example 5 according to the present invention.

FIG. 8 shows spherical aberration (mm), astigmatism (mm), and distortion (%) of the imaging lens in Example 4. As shown in FIG. 8, each aberration is corrected favorably.

EXAMPLE 5

The basic lens data is shown below in Table 5.

Example 5
Unit mm f = 2.03
Fno = 2.23
ω (°) = 60.0
ih = 2.28
TTL = 4.64

Surface Data

| Surface Number i | Curvature Radius r | Surface Distance d | Refractive Index Nd | Abbe Number νd |
| --- | --- | --- | --- | --- |
| (Object)    | Infinity | Infinity |        |       |
| 1*          | Infinity | 0.355    | 1.5348 | 55.66 |
| 2*          | 2.245    | 0.846    |        |       |
| 3 (Stop)    | Infinity | −0.064   |        |       |
| 4*          | 1.543    | 0.562    | 1.5443 | 55.86 |
| 5*          | −4.878   | 0.125    |        |       |
| 6*          | 5.402    | 0.230    | 1.6503 | 21.54 |
| 7*          | 2.674    | 0.110    |        |       |
| 8*          | 43.709   | 0.629    | 1.5348 | 55.66 |
| 9*          | −0.770   | 0.035    |        |       |
| 10*         | −3.328   | 0.365    | 1.6391 | 23.25 |
| 11*         | 8.919    | 0.281    |        |       |
| 12*         | 2.717    | 0.380    | 1.5348 | 55.66 |
| 13*         | 0.896    | 0.400    |        |       |
| 14          | Infinity | 0.110    | 1.5168 | 64.20 |
| 15          | Infinity | 0.317    |        |       |
| Image Plane | Infinity |          |        |       |

Constituent Lens Data

| Lens | Start Surface | Focal Length |  |
| --- | --- | --- | --- |
| 1 | 1  | f1 = −4.20 | f456 = 3.95 |
| 2 | 4  | f2 = 2.22  | CA1 = 2.93  |
| 3 | 6  | f3 = −8.42 | CA2 = 1.88  |
| 4 | 8  | f4 = 1.42  | SAG L1F = 0.26 |
| 5 | 10 | f5 = −3.75 | SAG L1R = 0.42 |
| 6 | 12 | f6 = −2.70 |             |

Aspheric Surface Data

|    | First Surface | Second Surface | Fourth Surface | Fifth Surface | Sixth Surface | Seventh Surface |
| -- | ------------- | -------------- | -------------- | ------------- | ------------- | --------------- |
| k  | 0.00000E+00   | 0.00000E+00    | 0.00000E+00    | 0.00000E+00   | 0.00000E+00   | 0.00000E+00     |
| A4 | 1.72875E−01   | 3.20721E−01    | 5.88135E−03    | −3.90211E−01  | −6.47512E−01  | −4.11872E−01    |
| A6 | −1.08661E−01  | −1.05164E−01   | −3.11728E−01   | 3.43197E−01   | −2.66901E−01  | 5.93659E−01     |

-continued

Example 5
Unit mm

|  |  |  |  |  |  |  |
|---|---|---|---|---|---|---|
| A8  | 4.63623E−02  | 1.24568E−01  | 9.08916E−01  | −1.28559E+00 | 2.49035E+00  | −1.06887E+00 |
| A10 | −1.34416E−02 | −6.53543E−02 | −2.76101E+00 | 7.27879E−02  | −9.45186E+00 | 5.54355E−01  |
| A12 | 1.73868E−03  | 0.00000E+00  | 0.00000E+00  | 0.00000E+00  | 1.05420E+01  | 1.96700E−01  |
| A14 | 0.00000E+00  | 0.00000E+00  | 0.00000E+00  | 0.00000E+00  | 0.00000E+00  | 0.00000E+00  |
| A16 | 0.00000E+00  | 0.00000E+00  | 0.00000E+00  | 0.00000E+00  | 0.00000E+00  | 0.00000E+00  |

|  | Eighth Surface | Ninth Surface | Tenth Surface | Eleventh Surface | Twelfth Surface | Thirteenth Surface |
|---|---|---|---|---|---|---|
| k   | 0.00000E+00  | −3.26363E+00 | 0.00000E+00  | 0.00000E+00  | 0.00000E+00  | −4.82616E+00 |
| A4  | −2.70368E−01 | −2.10367E−01 | 4.46342E−01  | 3.14351E−01  | −2.41376E−01 | −1.70148E−01 |
| A6  | 1.73821E+00  | 6.12589E−01  | −5.73026E−01 | −5.39626E−01 | 4.85809E−02  | 9.37351E−02  |
| A8  | −4.33791E+00 | −4.87581E−01 | −4.61254E−02 | 3.43589E−01  | −8.64242E−03 | −5.01025E−02 |
| A10 | 5.68448E+00  | −1.99787E+00 | 2.68990E−01  | −8.77252E−02 | 4.35727E−02  | 1.64341E−02  |
| A12 | −4.10168E+00 | 5.71799E+00  | −1.20260E−01 | −6.14956E−03 | −3.15635E−02 | −2.76239E−03 |
| A14 | 1.20191E+00  | −5.45873E+00 | 2.84071E−02  | 8.15030E−03  | 8.64100E−03  | 1.82605E−04  |
| A16 | 0.00000E+00  | 1.87436E+00  | −4.72685E−03 | −1.33079E−03 | −8.53991E−04 | 1.15576E−06  |

The imaging lens in Example 5 satisfies conditional expressions (a) and (1) to (15) as shown in Table 7.

Figure 10:
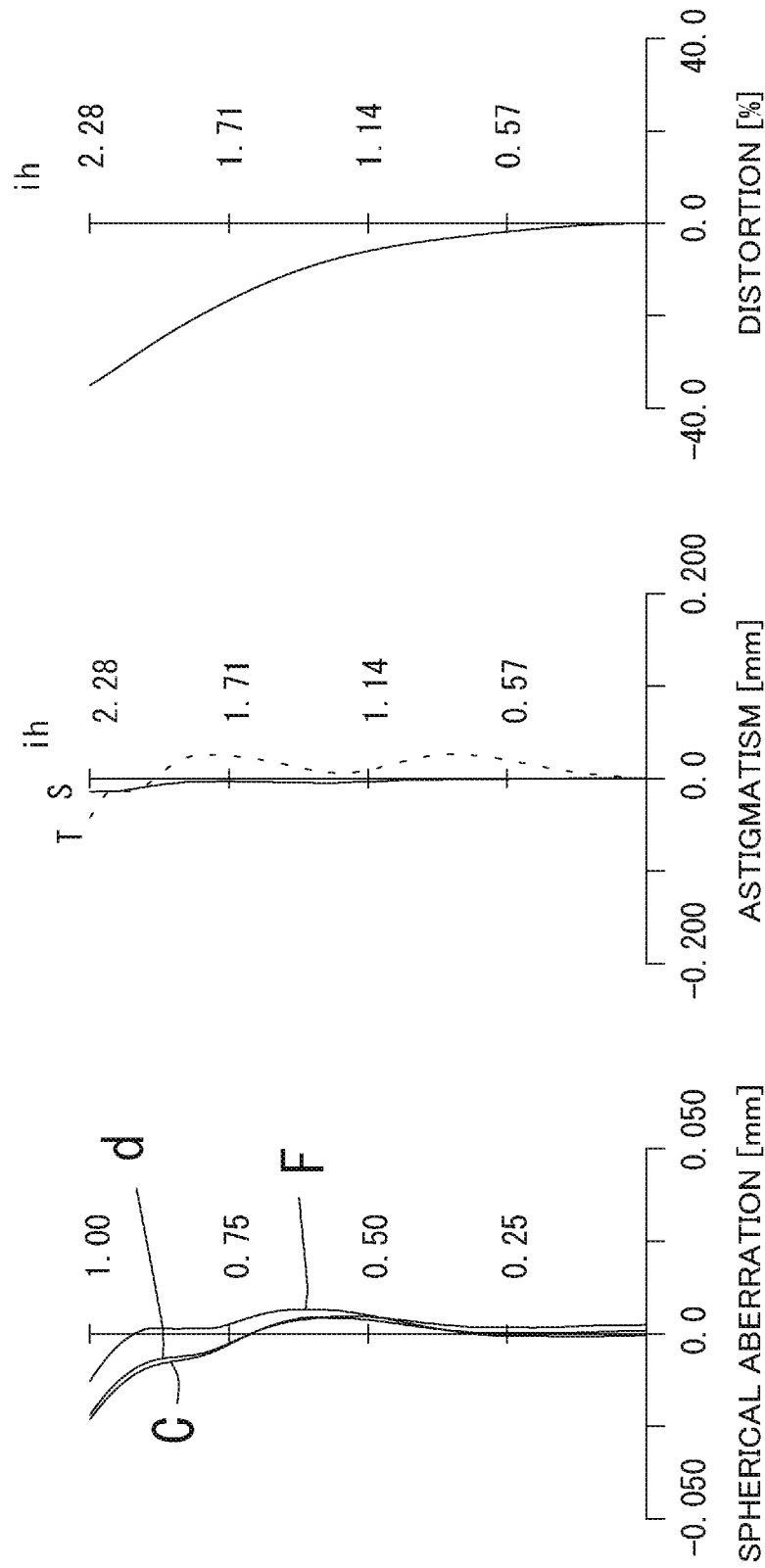
FIG. 10 shows spherical aberration, astigmatism, and distortion of the imaging lens in Example 5 according to the present invention.
Figure 11:
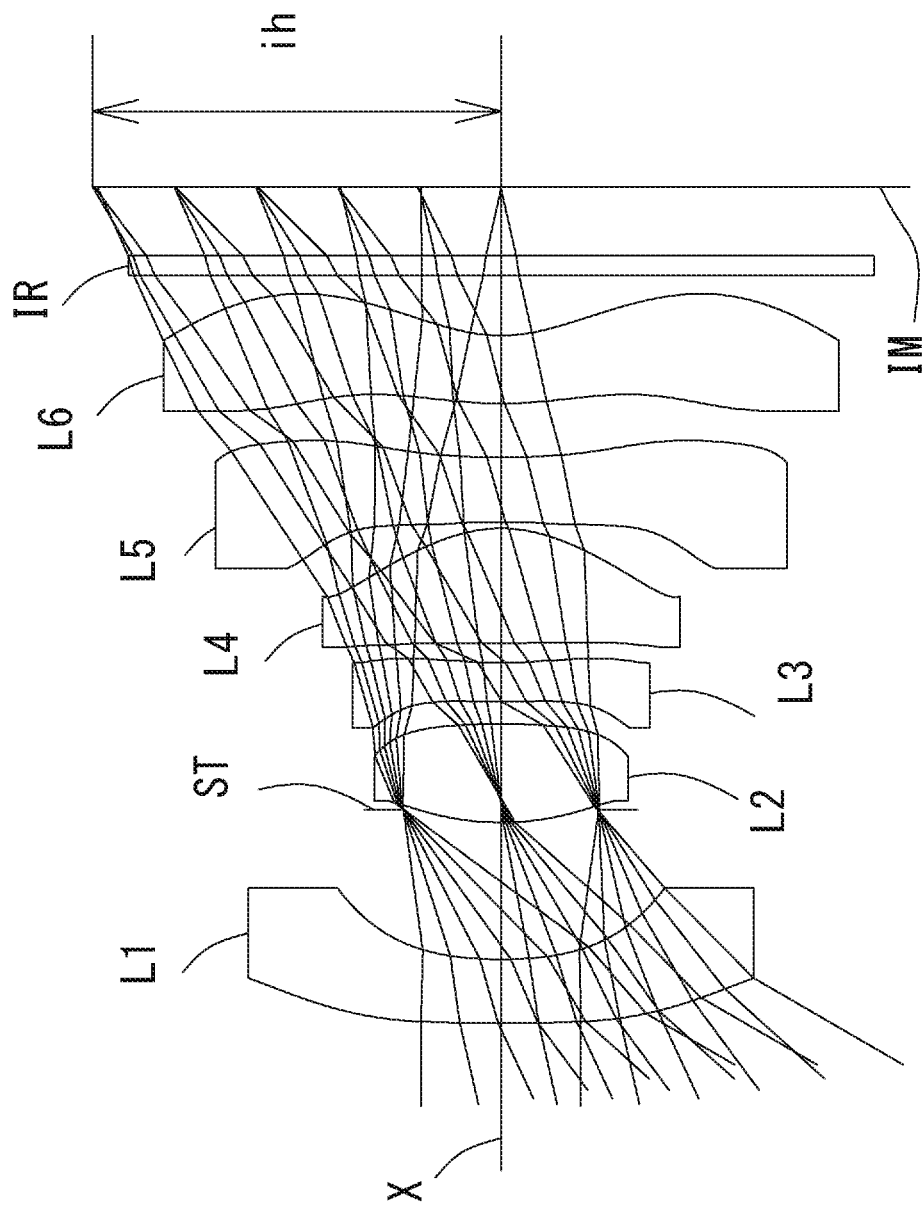
FIG. 11 is a schematic view showing the general configuration of an imaging lens in Example 6 according to the present invention.

FIG. 10 shows spherical aberration (mm), astigmatism (mm), and distortion (%) of the imaging lens in Example 5. As shown in FIG. 10, each aberration is corrected favorably.

EXAMPLE 6

The basic lens data is shown below in Table 6.

Example 6
Unit mm f = 2.04
Fno = 2.24
ω (°) = 59.8
ih = 2.28
TTL = 4.64

Surface Data

| Surface Number i | Curvature Radius r | Surface Distance d | Refractive Index Nd | Abbe Number vd |
|---|---|---|---|---|
| (Object)    | Infinity | Infinity |        |       |
| 1*          | Infinity | 0.355    | 1.5348 | 55.66 |
| 2*          | 2.265    | 0.838    |        |       |
| 3 (Stop)    | Infinity | −0.072   |        |       |
| 4*          | 1.514    | 0.550    | 1.5443 | 55.86 |
| 5*          | −5.955   | 0.125    |        |       |
| 6*          | 6.172    | 0.220    | 1.6503 | 21.54 |
| 7*          | 2.867    | 0.110    |        |       |
| 8*          | 36.388   | 0.641    | 1.5348 | 55.66 |
| 9*          | −0.789   | 0.035    |        |       |
| 10*         | −3.810   | 0.365    | 1.6391 | 23.25 |
| 11*         | 7.308    | 0.300    |        |       |
| 12*         | 2.298    | 0.380    | 1.5348 | 55.66 |
| 13*         | 0.865    | 0.500    |        |       |
| 14          | Infinity | 0.110    | 1.5168 | 64.20 |
| 15          | Infinity | 0.222    |        |       |
| Image Plane | Infinity |          |        |       |

Constituent Lens Data

| Lens | Start Surface | Focal Length | | |
|---|---|---|---|---|
| 1 | 1  | f1 = −4.23 | f456 = 3.71   |  |
| 2 | 4  | f2 = 2.28  | CA1 = 2.90    |  |
| 3 | 6  | f3 = −8.46 | CA2 = 1.86    |  |
| 4 | 8  | f4 = 1.45  | SAG L1F = 0.26 |  |
| 5 | 10 | f5 = −3.87 | SAG L1R = 0.41 |  |
| 6 | 12 | f6 = −2.86 |               |  |

Aspheric Surface Data

|  | First Surface | Second Surface | Fourth Surface | Fifth Surface | Sixth Surface | Seventh Surface |
|---|---|---|---|---|---|---|
| k  | 0.00000E+00 | 0.00000E+00 | 0.00000E+00 | 0.00000E+00  | 0.00000E+00  | 0.00000E+00  |
| A4 | 1.69505E−01 | 3.20721E−01 | 2.47869E−02 | −3.56643E−01 | −6.46652E−01 | −4.24558E−01 |

-continued

Example 6
Unit mm

|  |  |  |  |  |  |  |
|---|---|---|---|---|---|---|
| A6 | −9.80824E−02 | −1.07595E−01 | −2.99024E−01 | 1.65878E−01 | −4.28751E−01 | 5.58791E−01 |
| A8 | 3.97059E−02 | 1.87662E−01 | 9.44770E−01 | −9.33836E−01 | 2.44503E+00 | −1.05792E+00 |
| A10 | −1.19501E−02 | −1.17522E−01 | −2.71258E+00 | −2.63833E−01 | −8.97831E+00 | 7.07424E−01 |
| A12 | 1.62839E−03 | 0.00000E+00 | 0.00000E+00 | 0.00000E+00 | 1.05420E+01 | 1.96700E−01 |
| A14 | 0.00000E+00 | 0.00000E+00 | 0.00000E+00 | 0.00000E+00 | 0.00000E+00 | 0.00000E+00 |
| A16 | 0.00000E+00 | 0.00000E+00 | 0.00000E+00 | 0.00000E+00 | 0.00000E+00 | 0.00000E+00 |

|  | Eighth Surface | Ninth Surface | Tenth Surface | Eleventh Surface | Twelfth Surface | Thirteenth Surface |
|---|---|---|---|---|---|---|
| k | 0.00000E+00 | −3.56367E+00 | 0.00000E+00 | 0.00000E+00 | 0.00000E+00 | −4.51473E+00 |
| A4 | −2.76251E−01 | −2.76503E−01 | 4.27935E−01 | 3.04032E−01 | −2.77926E−01 | −1.69988E−01 |
| A6 | 1.70020E+00 | 7.14179E−01 | −5.59142E−01 | −5.39856E−01 | 6.51094E−02 | 8.97879E−02 |
| A8 | −4.30599E+00 | −6.05258E−01 | −5.10738E−02 | 3.46777E−01 | −1.17695E−02 | −4.67236E−02 |
| A10 | 5.68225E+00 | −1.95804E+00 | 2.80629E−01 | −8.74799E−02 | 4.26886E−02 | 1.61170E−02 |
| A12 | −4.10168E+00 | 5.71799E+00 | −1.20260E−01 | −6.69764E−03 | −3.11569E−02 | −2.89685E−03 |
| A14 | 1.20191E+00 | −5.45873E+00 | 2.84071E−02 | 7.97562E−03 | 8.59027E−03 | 1.84517E−04 |
| A16 | 0.00000E+00 | 1.87436E+00 | −4.72685E−03 | −1.23734E−03 | −8.51266E−04 | 5.30290E−06 |

The imaging lens in Example 6 satisfies conditional expressions (a) and (1) to (15) as shown in Table 7.

Figure 12:
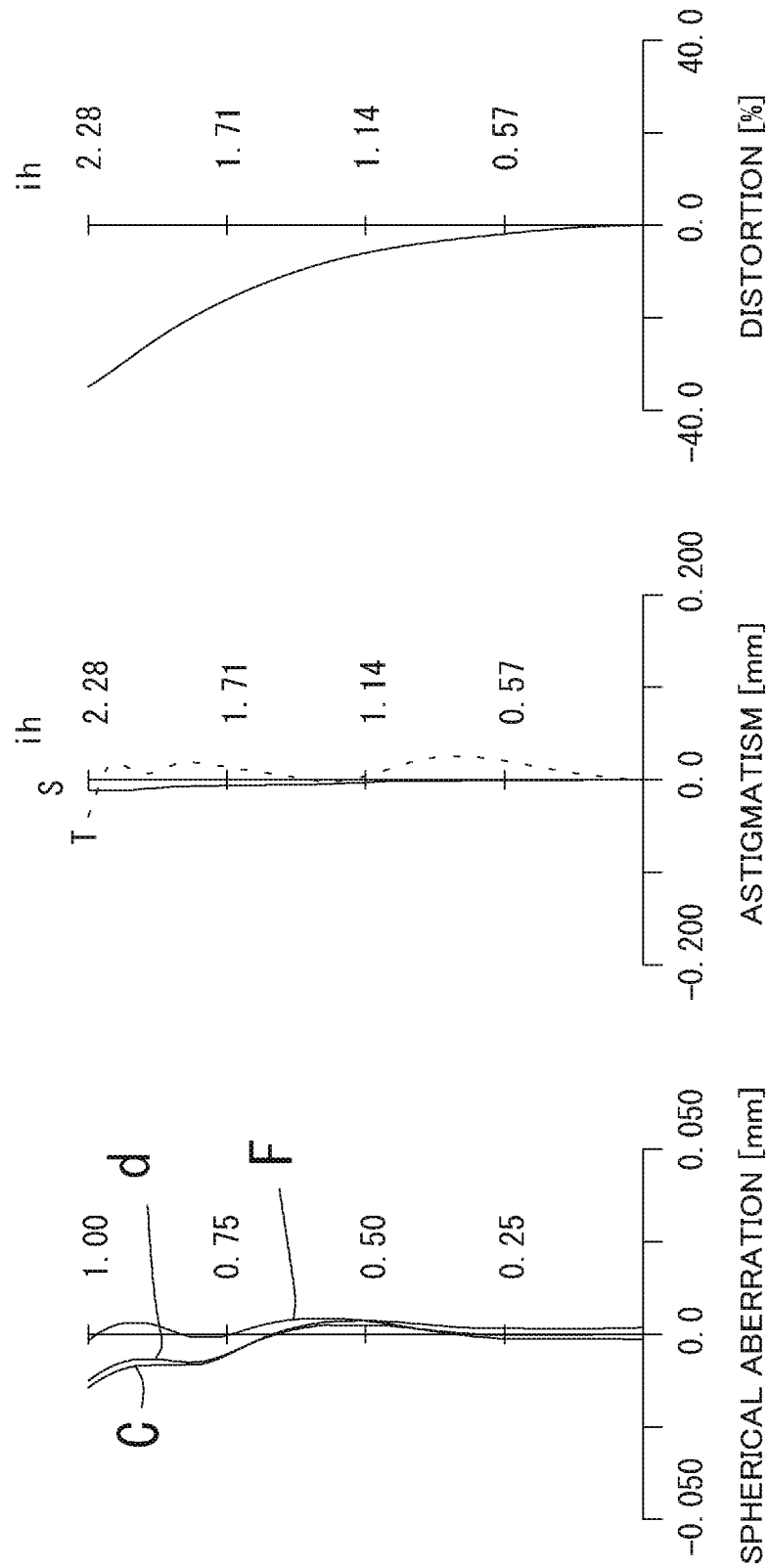
FIG. 12 shows spherical aberration, astigmatism, and distortion of the imaging lens in Example 6 according to the present invention.
Figure 13:
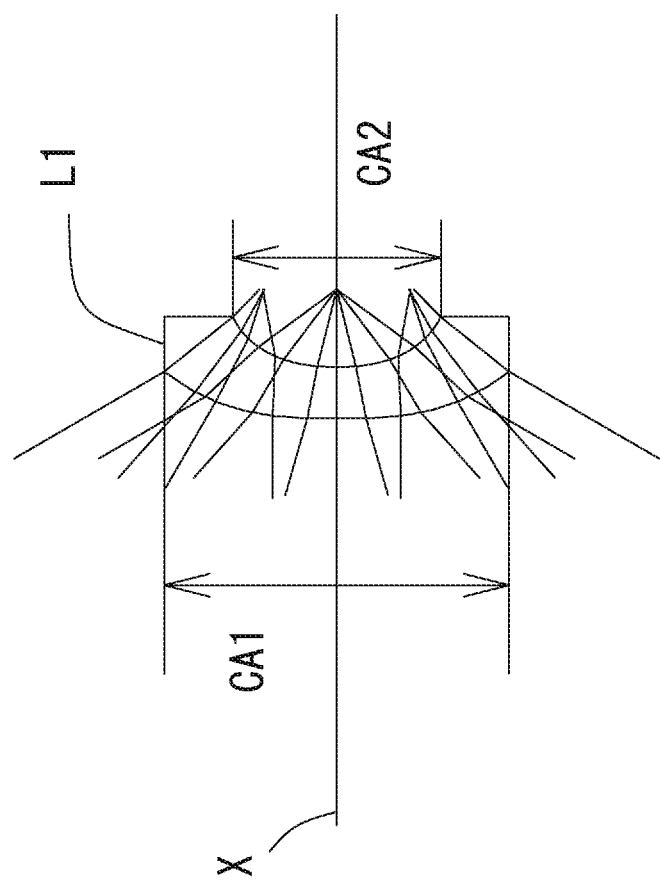
FIG. 13 illustrates an effective diameter according to the present invention.
Figure 14:
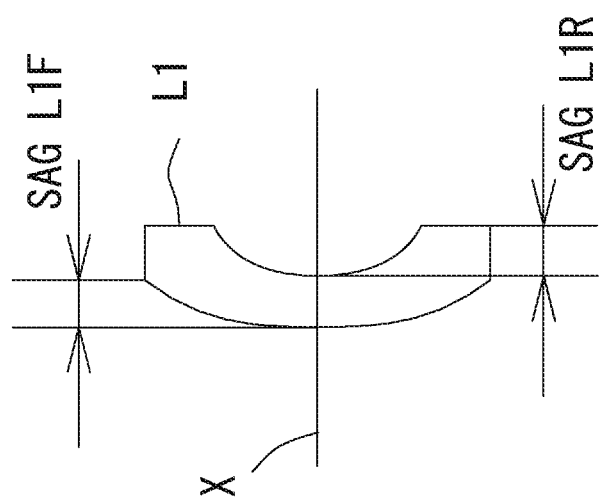
FIG. 14 illustrates an amount of sag at the peripheral area of the effective diameter of the first lens according to the present invention.

FIG. 12 shows spherical aberration (mm), astigmatism (mm), and distortion (%) of the imaging lens in Example 6. As shown in FIG. 12, each aberration is corrected favorably.

As explained above, according to the imaging lens related to the present embodiments, there can be provided the imaging lens with high resolution which achieves low-profileness and favorably corrects aberrations, wherein the wide field of view having the field of view (2ω) is 90 degrees or more is achieved, the total track length is less than 5.5 mm, and the ratio of total track length to diagonal length (TTL/2ih) is less than 1.1.

In table 7, values of conditional expressions (a), (1) to (15) related to the Examples 1 to 6 are shown.

When the imaging lens having six lenses according to the present invention is applied to the imaging device mounted in an increasingly compact and low-profile smartphone and a portable terminal device, a game console, PC, and an information terminal such as a robot, moreover, a home appliance and an automobile with the camera function, contribution is made to the low-profileness and the wide field of view for the camera, and high-performance can be achieved.

What is claimed is:

1. An imaging lens forming an image of an object on a solid-state image sensor, comprising in order from an object side to an image side,
    a first lens having negative refractive power,
    a second lens having positive refractive power and a biconvex shape,
    a third lens,
    a fourth lens having positive refractive power,
    a fifth lens having negative refractive power and is a double-sided aspheric lens, and
    a sixth lens that is a double-sided aspheric lens,

TABLE 7

|  | Conditional Expression (a) TTL/2IH | Conditional Expression (1) ω | Conditional Expression (2) SAG L1R/r2 | Conditional Expression (3) r2/f | Conditional Expression (4) f2 − f4 > 0 | Conditional Expression (5) f1/f | Conditional Expression (6) f2/f | Conditional Expression (7) f3/f |
|---|---|---|---|---|---|---|---|---|
| Example1 | 0.89 | 59.9 | 0.23 | 0.69 | 0.26 | −1.57 | 0.89 | −2.07 |
| Example2 | 0.98 | 60.1 | 0.47 | 0.74 | 0.18 | −1.55 | 0.97 | −2.43 |
| Example3 | 1.00 | 60.0 | 0.18 | 1.04 | 0.77 | −1.94 | 1.09 | −5.07 |
| Example4 | 1.01 | 60.0 | 0.18 | 1.12 | 0.65 | −2.09 | 1.01 | −3.02 |
| Example5 | 1.02 | 60.0 | 0.19 | 1.11 | 0.80 | −2.07 | 1.10 | −4.15 |
| Example6 | 1.02 | 59.8 | 0.18 | 1.11 | 0.82 | −2.08 | 1.12 | −4.15 |

|  | Conditional Expression (8) f4/f | Conditional Expression (9) f5/f | Conditional Expression (10) f6/f | Conditional Expression (11) f456/f | Conditional Expression (12) t1/f | Conditional Expression (13) CA1/ih | Conditional Expression (14) SAGL1F/CA1 | Conditional Expression (15) SAGL1R/CA2 |
|---|---|---|---|---|---|---|---|---|
| Example1 | 0.74 | −4.42 | −1.61 | 1.39 | 0.30 | 0.78 | 0.14 | 0.24 |
| Example2 | 0.86 | −2.76 | −2.01 | 1.92 | 0.54 | 1.08 | 0.18 | 0.35 |
| Example3 | 0.69 | −1.86 | −1.43 | 1.89 | 0.31 | 1.31 | 0.10 | 0.21 |
| Example4 | 0.67 | −1.92 | −1.29 | 1.88 | 0.37 | 1.28 | 0.10 | 0.22 |
| Example5 | 0.70 | −1.85 | −1.33 | 1.95 | 0.39 | 1.28 | 0.09 | 0.22 |
| Example6 | 0.71 | −1.90 | −1.40 | 1.82 | 0.38 | 1.27 | 0.09 | 0.22 | wherein the first lens has a concave surface facing the image side near an optical axis, and the sixth lens has a concave surface facing the image side near the optical axis and at least one pole point at an off-axial point on an image-side surface, and below conditional expressions (1), (5), and (9) are satisfied:

$$\omega \geq 45°  \quad (1)$$

$$-2.5 < f1/f < -1.0 \quad (5)$$

$$-6.0 < f5/f < -1.5 \quad (9)$$

where
 ω: a half field of view,
 f1: a focal length of the first lens,
 f5: a focal length of the fifth lens, and
 f: a focal length of the overall optical system.

2. The imaging lens according to claim 1, wherein a conditional expression below is satisfied:

$$0.1 < \text{SAG L1R}/r2 < 0.6 \quad (2)$$

where
 SAG L1R: an amount of sag at the peripheral area of the effective diameter of an image-side surface of the first lens, and
 r2: a curvature radius of the image-side surface of the first lens.

3. The imaging lens according to claim 1, wherein a conditional expression below is satisfied:

$$0.5 < r2/f < 1.5 \quad (3)$$

where
 r2: the curvature radius of an image-side surface of the first lens.

4. The imaging lens according to claim 1, wherein the third lens has negative refractive power and a concave surface facing the image side near the optical axis.

5. The imaging lens according to claim 1, wherein the fourth lens has a convex surface facing the image side near the optical axis.

6. The imaging lens according to claim 1, wherein the sixth lens has negative refractive power and a convex surface facing the object side near the optical axis.

7. The imaging lens according to claim 1, wherein a conditional expression below is satisfied:

$$f2 - f4 > 0 \quad (4)$$

where
 f2: a focal length of the second lens, and
 f4: a focal length of the fourth lens.

8. The imaging lens according to claim 1, wherein conditional expressions below are satisfied:

$$0.5 < f2/f < 1.5 \quad (6)$$

$$-6.0 < f3/f < -1.5 \quad (7)$$

$$0.5 < f4/f < 1.5 \quad (8)$$

$$-2.5 < f6/f < -1.0 \quad (10)$$

where
 f2: a focal length of the second lens,
 f3: a focal length of the third lens,
 f4: a focal length of the fourth lens, and
 f6: a focal length of the sixth lens.

9. The imaging lens according to claim 1, wherein a conditional expression below is satisfied:

$$1.0 < f456/f < 2.5 \quad (11)$$

where
 f456: a composite focal length of the fourth lens, the fifth lens and the sixth lens.

10. The imaging lens according to claim 1, wherein a conditional expression below is satisfied:

$$0.2 < t1/f < 0.6 \quad (12)$$

where
 t1: a distance along the optical axis between the first lens and the second lens.

11. The imaging lens according to claim 1, wherein a conditional expression below is satisfied:

$$0.5 < CA1/ih < 2.0 \quad (13)$$

where
 CA1: an effective diameter of an object-side surface of the first lens,
 Ih: a maximum image height.

12. The imaging lens according to claim 1, wherein conditional expressions below are satisfied:

$$0.05 < \text{SAG L1F}/CA1 < 0.50 \quad (14)$$

$$0.05 < \text{SAG L1R}/CA2 < 0.50 \quad (15)$$

where
 SAG L1F: an amount of sag at the peripheral area of the effective diameter of an object-side surface of the first lens,
 SAG L1R: an amount of sag at the peripheral area of the effective diameter of an image-side surface of the first lens,
 CA1: an effective diameter of the object-side surface of the first lens,
 CA2: an effective diameter of the image-side surface of the first lens.

13. An imaging lens forming an image of an object on a solid-state image sensor, comprising in order from an object side to an image side:
 a first lens having negative refractive power;
 a second lens having positive refractive power;
 a third lens having a concave surface facing the image side near an optical axis;
 a fourth lens having positive refractive power and a meniscus shape;
 a fifth lens having negative refractive power and is a double-sided aspheric lens; and
 a sixth lens that is a double-sided aspheric lens,
 wherein the first lens has a concave surface facing the image side near the optical axis, and the sixth lens has a concave surface facing the image side near the optical axis and at least one pole point at an off-axial point on an image-side surface, and below conditional expressions (1) and (5) are satisfied:

$$\omega \geq 45° \quad (1)$$

$$-2.5 < f1/f < -1.0 \quad (5)$$

where
 ω: a half field of view
 f1: a focal length of the first lens, and
 f: a focal length of the overall optical system.

14. The imaging lens according to claim 13, wherein conditional expressions below are satisfied:

$$0.5 < f2/f < 1.5 \quad (6)$$

$$-6.0 < f3/f < -1.5 \quad (7)$$

$0.5 < f4/f < 1.5$     (8)

$-6.0 < f5/f - 1.5$     (9)

$-2.5 < f6/f < -1.0$     (10)

where
- f2: a focal length of the second lens,
- f3: a focal length of the third lens,
- f4: a focal length of the fourth lens,
- f5: a focal length of the fifth lens, and
- f6: a focal length of the sixth lens.

\* \* \* \* \*